(12) United States Patent
Dorr et al.

(10) Patent No.: US 9,954,208 B2
(45) Date of Patent: Apr. 24, 2018

(54) HEARING AID BATTERY PACKAGING

(71) Applicant: Spectrum Brands, Inc., Middleton, WI (US)

(72) Inventors: William R. Dorr, Madison, WI (US); Christopher A. Harris, Madison, WI (US); Dave Young, Lodi, WI (US); Tom Anderson, Blanchardville, WI (US); Jason Lahaye, Baraboo, WI (US); Marek Kokoszka, Fort Atkinson, WI (US); Dan R. Teteak, Madison, WI (US)

(73) Assignee: SPECTRUM BRANDS, INC., Middleton, WI (US)

( * ) Notice: Subject to any disclaimer, the term of this patent is extended or adjusted under 35 U.S.C. 154(b) by 0 days.

(21) Appl. No.: 15/694,490

(22) Filed: Sep. 1, 2017

(65) Prior Publication Data
US 2018/0013116 A1 Jan. 11, 2018

Related U.S. Application Data

(63) Continuation-in-part of application No. 15/148,951, filed on May 6, 2016.
(Continued)

(51) Int. Cl.
*B65D 85/88* (2006.01)
*H01M 2/10* (2006.01)
(Continued)

(52) U.S. Cl.
CPC ...... *H01M 2/1094* (2013.01); *B65D 73/0021* (2013.01); *B65D 75/367* (2013.01); *B65D 75/566* (2013.01); *B65D 79/02* (2013.01); *B65D 85/30* (2013.01); *B65D 2575/362* (2013.01); *B65D 2585/88* (2013.01); *H01M 2220/30* (2013.01)

(58) Field of Classification Search
CPC .............. B65D 73/0014; B65D 75/367; B65D 83/0454; B65D 2585/88
USPC ....... 206/703–705, 461, 462, 464, 467, 470, 206/471, 533, 807
See application file for complete search history.

(56) References Cited

U.S. PATENT DOCUMENTS 3,414,161 A * 12/1968 Doring ............... B65D 83/0454
221/155
3,433,351 A * 3/1969 Zaborney ........... B65D 83/0454
206/704
(Continued)

*Primary Examiner* — Luan K Bui
(74) *Attorney, Agent, or Firm* — Foley & Lardner LLP

(57) ABSTRACT

A battery package includes a card, a cover attached to the card, and a tray positioned between the card and the cover. The cover includes a body having an opening and a door with the door movable between an open position to provide access to the opening and a closed position in which the door closes the opening. The tray includes multiple receptacles arranged symmetrically about a central post. The front surface of the central post is spaced apart from the interior surface of the front portion of the cover by a distance. The battery package also includes multiple batteries and multiple tabs. The tray is rotatable to selectively align one of the receptacles with the opening in a battery removal position. With the door in the open position, the tab attached to the battery in the receptacle in the battery removal position is accessible through the opening.

20 Claims, 24 Drawing Sheets

Related U.S. Application Data

(60) Provisional application No. 62/158,941, filed on May 8, 2015.

(51) Int. Cl.
*B65D 73/00* (2006.01)
*B65D 85/30* (2006.01)
*B65D 75/56* (2006.01)
*B65D 79/02* (2006.01)
*B65D 75/36* (2006.01)

(56) References Cited

U.S. PATENT DOCUMENTS

| | | | | |
|---|---|---|---|---|
| 3,995,767 | A * | 12/1976 | Brindley | B65D 83/02 206/704 |
| 6,039,185 | A * | 3/2000 | Pedracine | H01M 2/1038 206/704 |
| 6,659,281 | B2 * | 12/2003 | Gaffney | B65D 83/0454 206/704 |
| 2002/0030062 | A1 * | 3/2002 | Garrant | B65D 83/0409 221/87 |
| 2005/0103680 | A1 * | 5/2005 | Nakatsu | B65D 75/327 206/704 |
| 2005/0269237 | A1 * | 12/2005 | Tung | A61J 7/04 206/533 |

* cited by examiner

HEARING AID BATTERY PACKAGING

CROSS-REFERENCE TO RELATED PATENT APPLICATIONS

This application is a continuation-in-part of U.S. application Ser. No. 15/148,951, filed May 6, 2016, pending, which claims the benefit of U.S. Application No. 62/158,941, filed May 8, 2015, both of which are incorporated herein by reference in their entireties.

BACKGROUND

The present invention relates to packaging for button cell batteries, and particularly to packaging for hearing aid batteries.

Button cell batteries are frequently used in hearing aids, and, are thus small in size having a diameter which can be less than half the width of a finger. Moreover, the small battery size results in a limited power supply, and requires replacement in a hearing aid at regular intervals. In order to accommodate frequent replacement of these batteries, the batteries are typically sold in packages containing a plurality of the batteries.

One known battery package includes a plastic cover rotatably mounted to a card. The cover includes receptacles which open to the card. Each receptacle receives a single battery which is accessed through a cutout formed in the card. The cover is rotated to align a battery with the cutout, and the battery is popped out of the receptacle through the cutout. However, because the battery is accessed through the cutout in the card, it can be difficult to grasp the battery, instead, the user may turn the package over and rely on gravity to remove the battery from the package. Further, because cutout is on the back of the card, the cutout is obscured from a user looking at the front of the packaging.

SUMMARY OF THE INVENTION

One embodiment of the invention relates to a battery package. The battery package includes a card, a cover attached to the card, and a tray positioned between the card and the cover. The cover includes a body having a front portion, an outer circumferential flange, and an annular transition portion extending between the front portion and the flange. The body includes an opening and a door and the door is movable between an open position to provide access to the opening and a closed position in which the door closes the opening. The tray includes multiple receptacles arranged symmetrically about a central post. The front surface of the central post is spaced apart from the interior surface of the front portion of the cover by a distance. The battery package also includes multiple batteries, each battery positioned within one of the receptacles, and multiple tabs, each tab removably attached to one of the batteries with each tab positioned between the cover and the battery to which the tab is attached. The tray is rotatable relative to the card and the cover about an axis of rotation that extends through the central post to selectively align one of the receptacles with the opening in a battery removal position. With the door in the open position, the tab attached to the battery in the receptacle in the battery removal position is accessible through the opening from the front of the cover and the peripheral edge of the cover.

Another embodiment of the invention relates to a battery package. The battery package includes a card, a cover, a tray, multiple batteries, and multiple tabs. The card includes a first portion and a second portion separated by a perforation configured to detach the first portion from the second portion. The first portion includes an opening configured to receive a display hanger. The cover is attached to the second portion card. The cover includes an opening and a door, wherein the door is movable between an open position to provide access to the opening and a closed position in which the door closes the opening. The tray is positioned between the card and the cover. The tray includes multiple receptacles. Each battery is positioned within one of the receptacles. Each tab is removably attached to one of the batteries, wherein each tab is positioned between the cover and the battery to which the tab is attached. The tray is rotatable relative to the second portion of the card and the cover about an axis of rotation to selectively align one of the receptacles with the opening in a battery removal position. With the door in the open position, the tab attached to the battery in the receptacle in the battery removal position is accessible through the opening.

Another embodiment of the invention relates to a battery package. The battery package includes a card, a cover attached to the card, and a tray positioned between the card and the cover. The cover includes an opening and a door. The door is movable between an open position to provide access to the opening and a closed position in which the door closes the opening. The tray includes multiple receptacles. The battery package further includes multiple batteries and multiple tabs. Each battery is positioned within one of the receptacles. Each tab is removably attached to one of the batteries. Each tab is positioned between the cover and the battery the tab is attached to. Each tab includes a free end extending past the battery to which the tab is attached. The tray is rotatable relative to the card and the cover to selectively align one of the receptacles with the opening in a battery removal position. The free end of the tab attached to the battery in the receptacle in the battery removal position is depressed by the door toward the card when the door is in the closed position. The free end of the tab attached to the battery in the receptacle in the battery removal position moves away from the card when the door moves from the closed position to the open position.

Another embodiment of the invention relates to a battery package. The battery package includes a card, a cover attached to the card, and a tray positioned between the card and the cover. The cover includes an opening and a door. The door is movable between an open position to provide access to the opening and a closed position in which the door closes the opening. The tray includes multiple receptacles. The battery package further includes multiple batteries and multiple tabs. Each battery is positioned within one of the receptacles. Each tab is removably attached to one of the batteries. Each tab is positioned between the cover and the battery to which the tab is attached. The tray is rotatable relative to the card and the cover to selectively align one of the receptacles with the opening in a battery removal position. With the door in the open position, the tab attached to the battery in the receptacle in the battery removal position is accessible through the opening which provides an arc of access of at least 90 degrees.

DETAILED DESCRIPTION

Figure 1:
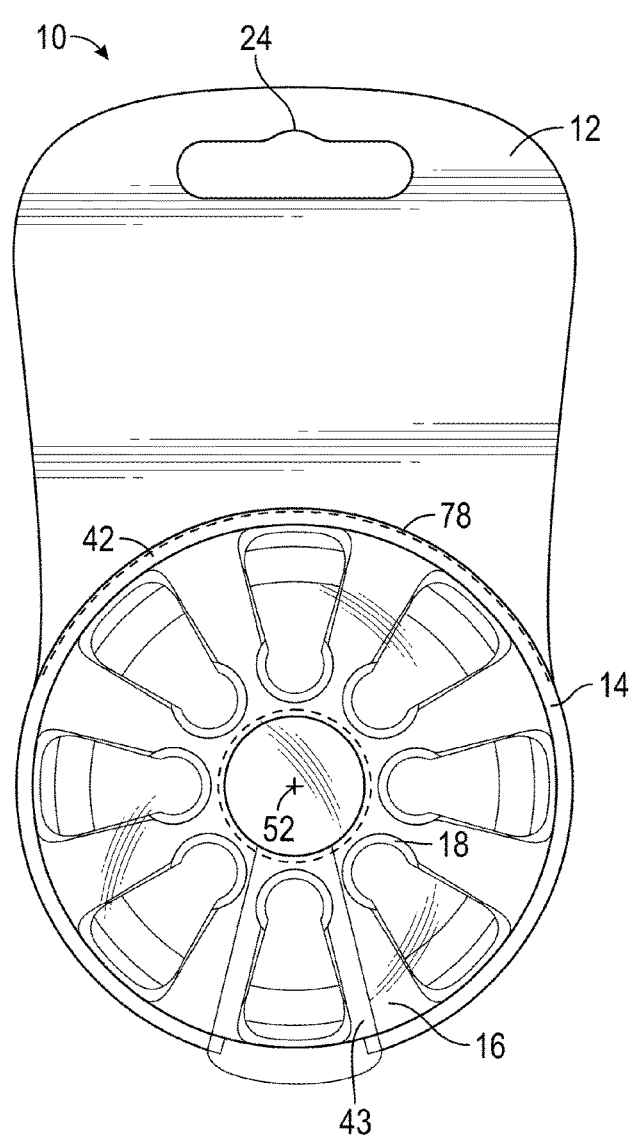
FIG. 1 is a front view of a battery pack, according to an exemplary embodiment.
Figure 2:
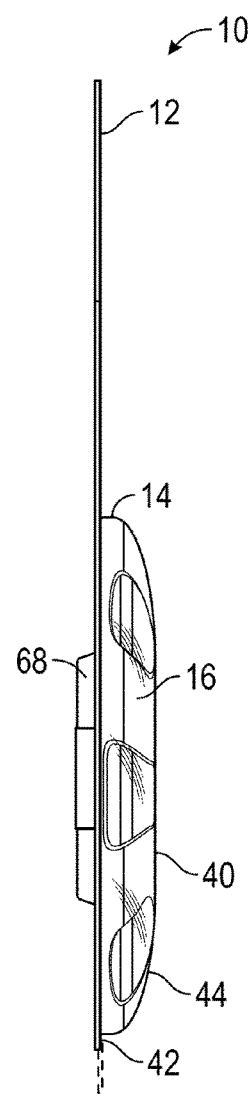
FIG. 2 is a side view of the battery pack of FIG. 1.
Figure 3:
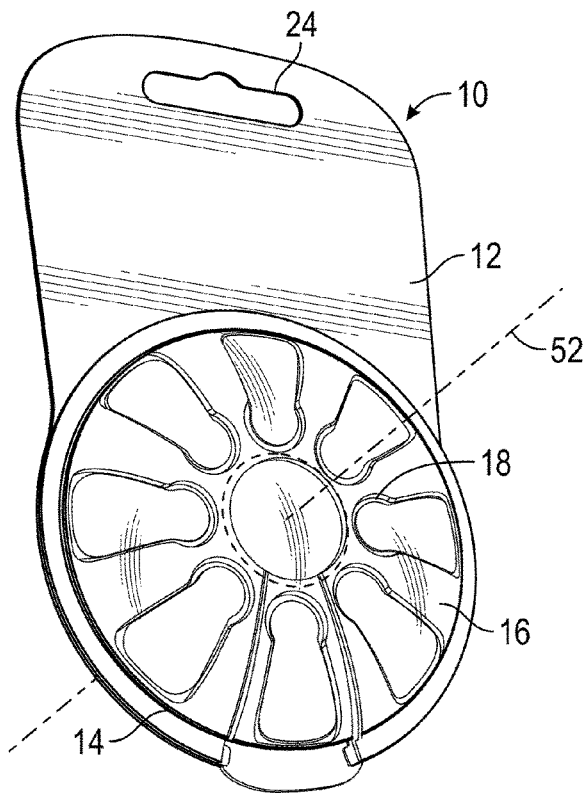
FIG. 3 is a front perspective view of the battery pack of FIG. 1.

Referring to FIGS. 1-8, a battery pack or package 10 is illustrated according to an exemplary embodiment. The battery pack 10 includes a card 12, a transparent cover or blister 14 that is fixed to the card 12, and a tray or dial 16 that is positioned between the card 12 and the cover 14 and is rotatable relative to the card 12 and the cover 14. One or more button cell batteries 18 are received in the tray 16, and are contained beneath the cover 14. The tray 16 and the cover 14 are configured with a relatively low profile, allowing the battery 18 to be easily removed from the battery pack 10 for use.

Figure 4:
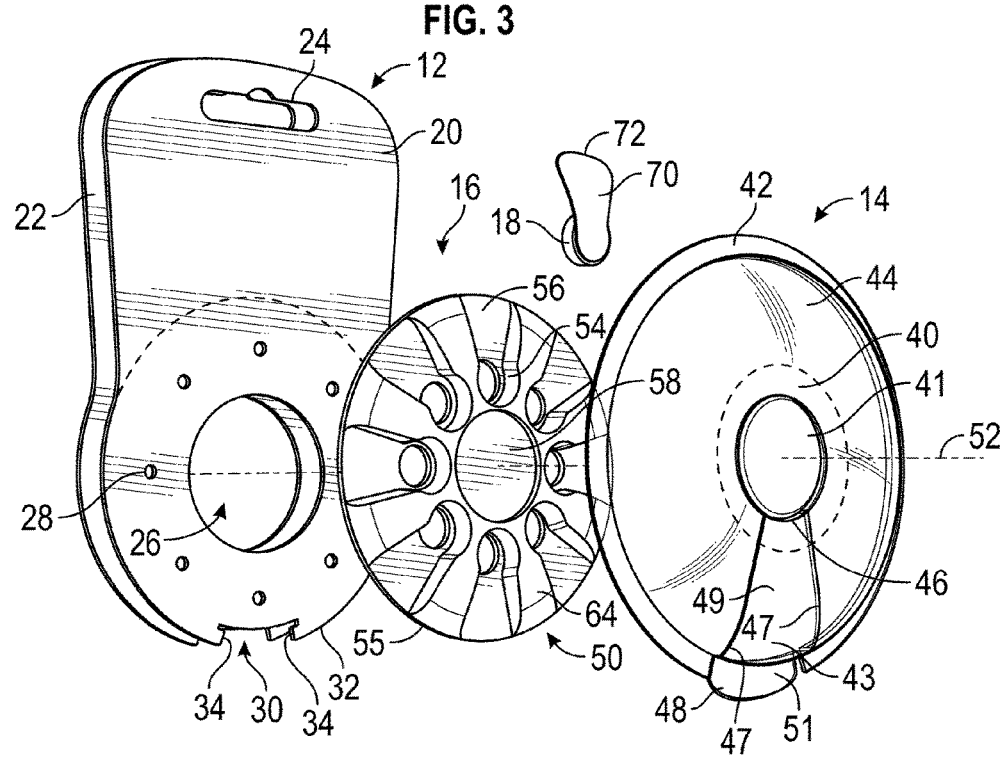
FIG. 4 is a front exploded perspective view of the battery pack of FIG. 1.
Figure 5:
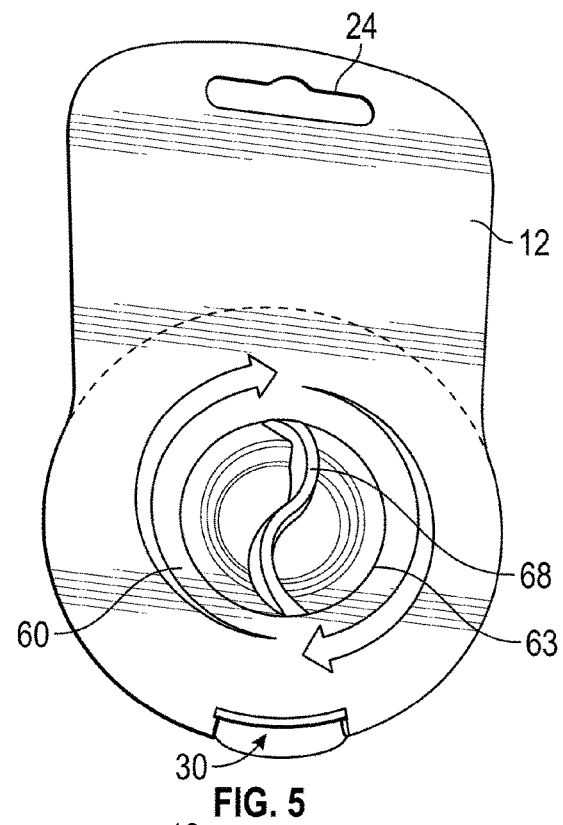
FIG. 5 is a rear perspective view of the battery pack of FIG. 1.
Figure 6:
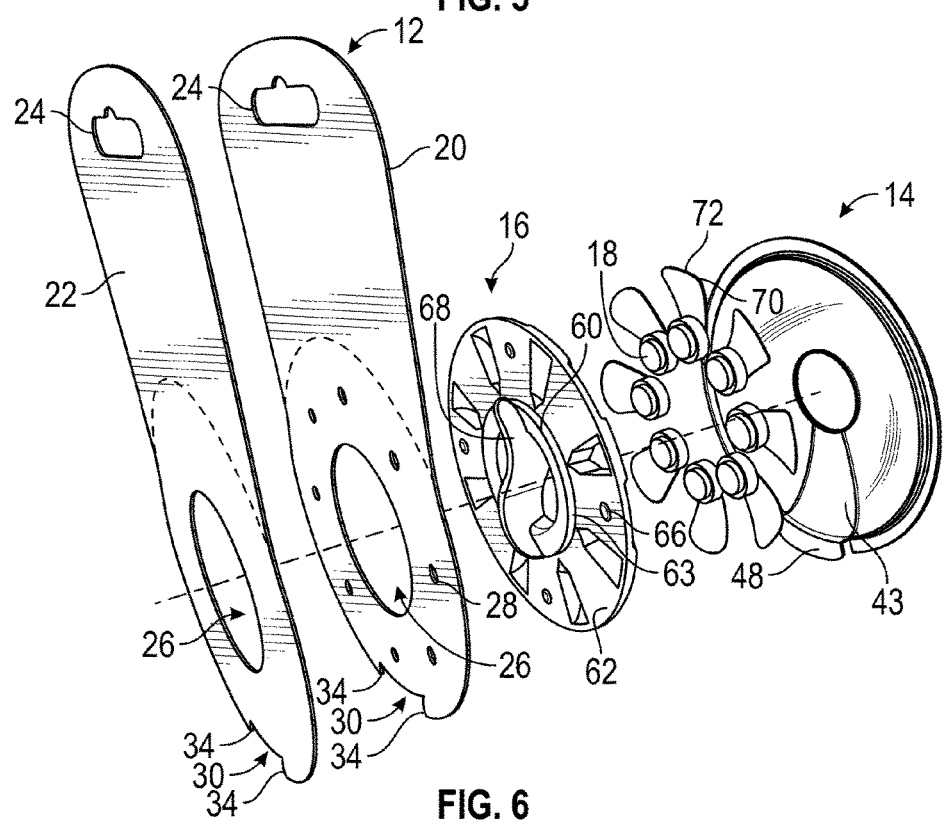
FIG. 6 is a rear exploded perspective view of the battery pack of FIG. 1.

The card 12 is preferably formed from a flexible material. In one embodiment, the card 12 is a die-cut paperboard card which can carry identifying indicia and advertising thereon. In other embodiments, the card 12 may be formed from another material, such as a polymer material, or combination of materials. The card 12 may be formed from multiple layers, such as a first or front layer 20 and a second or rear layer 22. The layers may have different properties (e.g., shape, profile, thickness, material, etc.). For example, the front layer 20 may be configured to carry the identifying indicia and advertising while the rear layer 22 may be configured to provide structural rigidity to the card 12. A display hanger opening or slot 24 formed through both the front layer 20 and the rear layer 22 of the card 12 can be provided to facilitate hanging the battery pack 10 on a display hanger for display to potential users. A circular opening 26 is formed in the front layer 20 and the rear layer 22 of the card 12. The circular opening 26 is configured to receive a portion of the tray 16 such that the tray 16 is rotatably coupled to the card 12. As shown in FIGS. 4 and 6, a multitude of indexing apertures 28 are provided in the front layer 20 and may optionally extend through the rear layer 22. The apertures 28 receive features of the tray 16 to provide indexing positions for the tray 16 related to the number of batteries 18 contained within the battery package 10. The indexing apertures 28 are equidistantly spaced about the circular opening 26. A cutout 30 in the front layer 20 and the rear layer 22 along a bottom edge 32 of the card 12 provides clearance for a door 43 of the cover 14.

The cover 14 is a dome-shaped body with a relatively flat front portion 40, an outer circumferential flange 42, and a convex, annular transition portion 44 extending between the front portion 40 and the flange 42. The front portion 40 is substantially parallel to the card 12. The front portion 40 may include a central recess or indent 41. The flange 42 is affixed to the card 12, forming an internal volume between the cover 14 and the card 12 in which the tray 16 is disposed. According to an exemplary embodiment, the flange 42 is coupled to the front layer 20 of the card 12, such as with an adhesive, heating sealing, etc. In another embodiment, the flange 42 may be coupled to the rear layer 22 of the card 12 and captured between the front layer 20 and the rear layer 22. In other embodiments, the cover 14 may be coupled to the card 12 by other means, such as with anchors or protrusions that engage the card 12, mechanical fasteners, or any other fastening means that prevents rotation of the cover 14 relative to the card 12.

The cover 14 is preferably formed at least partially from a clear plastic which allows potential users to view the batteries 18 in the battery pack 10. According to one exemplary embodiment, the entire cover 14 is formed (e.g., by thermoforming) from a transparent plastic material. In other embodiments, only a portion of the cover may be transparent. For example, the cover 14 may be formed from multiple components, only some of which are transparent plastic or portions of the cover 14 may be made opaque (e.g., with a paint, dye, label, etc.).

The interior volume between the cover 14 and the card 12, as well as the tray 16 and batteries 18 contained therein, may be accessed by a user through an opening 45 in the cover 14 with an integrally formed door 43 (e.g., flap, hatch, etc.). The cover 14 is positioned on the card 12 such that a portion of the flange 42 is coincident with the bottom edge 32 of the card 12. The door 43 is a wedge-shaped body with a narrow end coupled to the cover 14 by a living hinge 46 and a relatively wide distal end 48. The distal end 48 is aligned with the cutout 30 along the bottom edge 32 of the card 12. The door 43 includes a curved convex portion 49 that corresponds to the transition portion 44 of the cover 14 and a flat flange or latch 51 that corresponds to the flange 42 of the cover 14 and includes the distal end 48 of the door 43. The edges 47 of the door 43 may be initially fixed to the cover 14 along a breakable seam or by tack points which join the edges 47 to the cover 14 to hold the door 43 in a closed position (e.g., preventing access to the batteries 18 through the opening 45). In order to access the batteries 18, the seam or tack points are severed to allow the door 43 to pivot about the living hinge 46 to the open position (see FIG. 7). Although tack points are disclosed to initially hold the door 43 in the closed position, other methods can be used, such as an adhesive strip covering the door 43.

Once the seam or tack points are severed or the door 43 is otherwise free to pivot about the living hinge 46, the door 43 may be held in the closed position through other means. According to an exemplary embodiment, in the closed position, the flange 51 of the door 43 is aligned with the cutout 30 and is held in place by tabs 34 extending inwardly into the cutout 30 from the cutout edges so that the flange 51 is located below the tabs 34. When moving the door 43 to the open position, the tabs 34 and/or the door 43 deform to allow the flange 51 of the door 43 to move out of the cutout 30 and the door 43 to pivot about the living hinge 46, away from the cover 14. Similarly, when moving the door 43 to the closed position, the tabs 34 and/or the door 43 deform to allow the flange 51 of the door 43 to pass into the cutout 30. The door 43 may be configured such that its default position is the open position, the closed position, or a partially opened position.

The tray 16 includes multiple battery receptacles 50 that open toward the front of the battery pack 10 (e.g., toward the cover 14 and away from the card 12). The receptacles 50 are spaced equidistantly from a rotational axis 52, and are individually sized to receive one of the disc shaped batteries 18. The receptacle 50 includes a first portion, shown as a cylindrical portion 54, in which the battery 18 is received, and a second portion, shown as a wedge-shaped portion 56, extending away from the cylindrical portion 54 toward the peripheral edge 55 of the tray 16. The receptacle 50 is open in two directions—toward the front surface 64 of the tray 16 and toward the peripheral edge 55 of the tray 16. The two directions of access provide an arc of access of 90°. This improves user access to the receptacle 50 and the battery 18 it contains as compared to known battery packages that only provide access to a battery from a single direction (e.g., from the back side of a tray). When the tray 16 is positioned between the card 12 and the cover 14, the cylindrical portions 54 of the receptacles 50 are generally aligned with the front portion 40 of the cover 14 while the wedge-shaped portions 56 are generally aligned with the transition portion 44 of the cover 14.

Although each receptacle 50 is shown as being configured to receive a single disc shaped battery 18, the receptacles can be formed to receive more than one battery and batteries which are not disc shaped without departing from the scope of the invention. The tray 16 is illustrated as including eight receptacles 50 so that the battery pack 10 can hold eight batteries 18. In other embodiments, the tray 16 includes more or fewer receptacles 50 and the battery pack 10 can hold more or fewer batteries 18.

The tray 16 is rotatably coupled to the card 12. The tray 16 includes a central boss 60 extending in a rearward direction from a rear surface 62 of the tray 16 and away from a curved front surface 64 surrounding the receptacles 50. The central boss 60 is coaxial with the rotational axis 52 of the tray 16. The central boss 60 extends through the circular opening 26 of the card 12. The central boss 60 provides a cylindrical bearing surface 63 that contacts the edges of the card 12 defining the circular opening 26 to locate the tray 16 relative to the card 12 and the cover 14. One or more protrusions 66 extend rearward from the rear surface 62 and are configured to engage the corresponding indexing apertures 28 in the card 12. The indexing aperture 28 are each preferably spaced radially about the axis 52 such that rotation of the tray 16 is indexed to align the battery receptacles 50 with the opening 45 in the cover 14 as the tray 16 rotates about the axis 52. Although a plurality of indexing apertures 28 formed in the card 12 which are engageable with the protrusions 66 extending from the rear surface 62 of the tray 16 is disclosed, other methods for indexing the rotation of the tray 16 can be used without departing from the scope of the invention, such as providing a plurality of protrusions which engage a single aperture, forming the apertures in the tray 16 and the protrusions on the card 12, and the like. Advantageously, the indexing also prevents inadvertent rotation of the tray 16, which may align a battery 18 with the opening 45 in the cover 14 when the door 43 is not in the closed position, resulting in a battery 18 falling out of the pack 10.

The central boss 60 of the tray 16 includes one or more grip features 68. According to an exemplary embodiment, the grip features are recesses formed in the central boss and separated by a raised wall 69 integrally formed with the central boss 60. The grip features 68 provide structures that may be grasped by the user, allowing the user to rotate the tray 16 about the rotational axis 52 to align a battery 18 with the opening 45 in the cover 14. According to an exemplary embodiment, the raised wall 69 is curved to provide an ergonomic structure and to provide a visual cue for the rotation of the tray 16. In other embodiments, the grip features 68 may be otherwise shaped. For example, the grip features may be formed by radial walls, a surface texture, a star-shaped structure, or any other suitable body that provides a structure that may be grasped by the user.

According to an exemplary embodiment, a depression 58 is formed on the front side of the tray 16. The depression 58 is centered on the rotational axis 52 and is surrounded by the receptacles 50. The depression 58 has a diameter and a depth such that it is configured to receive the central indent 41 of the cover when the tray 16 is positioned between the card 12 and the cover 14. With the tray 16 sandwiched between the card 12 and the cover 14, the tray 16 contacts the edges of the card 12 defining the circular opening 26 with the cylindrical bearing surface 63 of the central boss 60 and contacts the front face of the card 12 with the rear surface 62. The central boss 60 locates the tray 16 relative to the cover 14 such that the tray 16 only contacts the central indent 41 of the cover 14 (e.g., in the depression 58) and the peripheral edges 55 of the tray 16 and the front surface 64 are recessed from the transition portion 44 of the cover 14. The friction between the cover 14 and the tray 16 is therefore minimized. The tray 16 may be formed from a plastic material that provides a low friction surface on which the tray 16 rotates.

The batteries 18 can be any battery known in the art, such as a zinc air battery suitable for use as a hearing aid battery. The battery pack 10 may be configured for batteries of a wide variety of sizes (e.g., diameters, thicknesses, etc.). While the battery pack 10 is shown to contain eight button cell batteries 18, in other embodiments, the battery pack 10 may be configured to contain any number of batteries.

According to an exemplary embodiment, a self-adhesive tab 70 is fixed to each battery 18 to prevent premature discharge of the zinc air battery by covering openings in the battery 18 which allows atmospheric oxygen to enter the battery 18. Advantageously, the tab 70 simplifies handling and positioning the battery 18 when inserting the battery 18 in a battery operated device. Preferably, a free end 72 of each tab 70 is received in the second, wedge-shaped portions 56 of the receptacles 50. The tab 70 is preferably formed from a non-porous, relatively stiff material. For example, the tab 70 may be formed from a plastic film, a metal foil, a foil-backed film, or any other suitable material. The tabs 70 are presented on the front side of the battery pack 10 and are visible through the transparent cover 14. Each tab 70 includes the free end 72 and a fixed end 73 that is fixed to the battery 18. As shown in FIG. 1, the tab 70 extends for a length 75 between the two ends 72 and 73. The tab 70 may be colored to provide a visual cue (e.g., trade dress, number of batteries 18, etc.) to a potential buyer. The tab 70 may be colored to match the color of the card 12. In some embodiments, the tabs 70 are embossed or textured to make the tab 70 easier to grasp by the user. In some embodiments, as shown in FIG. 1, a grasping portion 79 of the tab 70 is textured. The grasping portion 79 is at least a portion of the part of the tab 70 that extends past the battery 18 to the free end 72.

Figure 11:
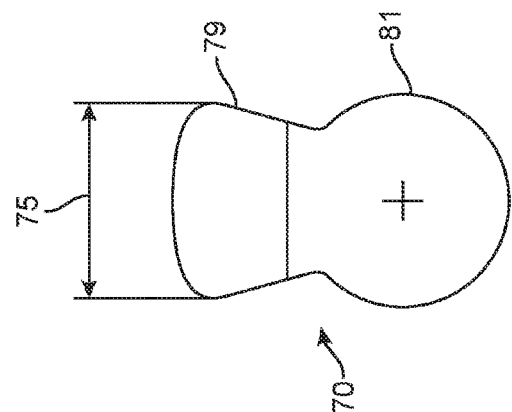
FIG. 11 is a front view of a removable tab, according to an exemplary embodiment.
Figure 10:
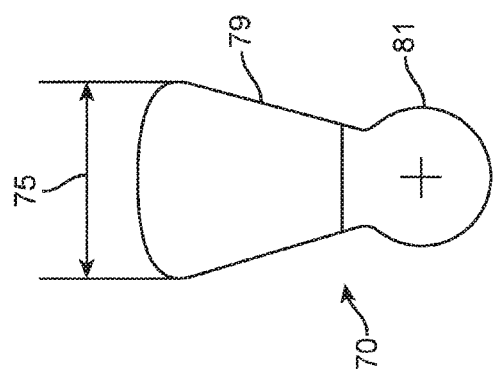
FIG. 10 is a front view of a removable tab, according to an exemplary embodiment.
Figure 9:
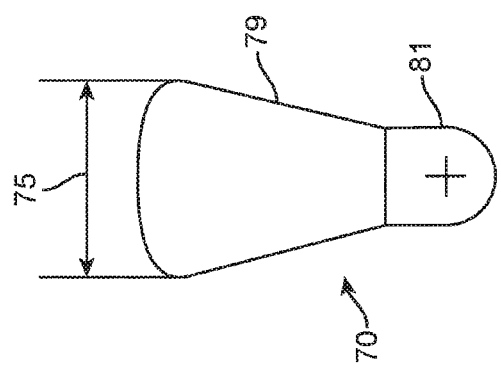
FIG. 9 is a front view of a removable tab, according to an exemplary embodiment.

Referring to FIGS. 9-11, the size and shape of the tab 70 may vary. The tab 70 includes the grasping portion 79 and a battery portion 81. The battery portion 81 is intended to line up with the center of the battery 18 when the battery portion 81 is attached to a battery 18. The width 75 of the grasping portion 79 (measured across the widest point) is preferably 9 millimeters or longer. The width of tabs used with conventional battery packs is 8.25 millimeters or less. The increased width 75 of the tabs 70 provides a larger surface area for the grasping portion 79 making the tab easier for a user to grasp than the taps used with conventional battery packs.

When the battery 18 and the attached tab 70 are received in the receptacle 50 of the battery tray 16, the tab 70 extends outward such that the free end 72 of the tab 70 extends toward the peripheral edge 55 of the tray 16. In some embodiments, the free end 72 of the tab 70 may extend beyond the front surface 64 of the tray 16. The free end 72 is pressed downward by the transition portion 44 of the cover 14. The battery 18 and the tab 70 are recessed with respect to the front surface 64 such that, when a particular receptacle 50 is not aligned with the opening 45 in the cover 14, the tab 70 does not become lodged in the gap between the front surface 64 of the tray 16 and the cover 14 when the tray 16 rotates about the axis 52.

Figure 7:
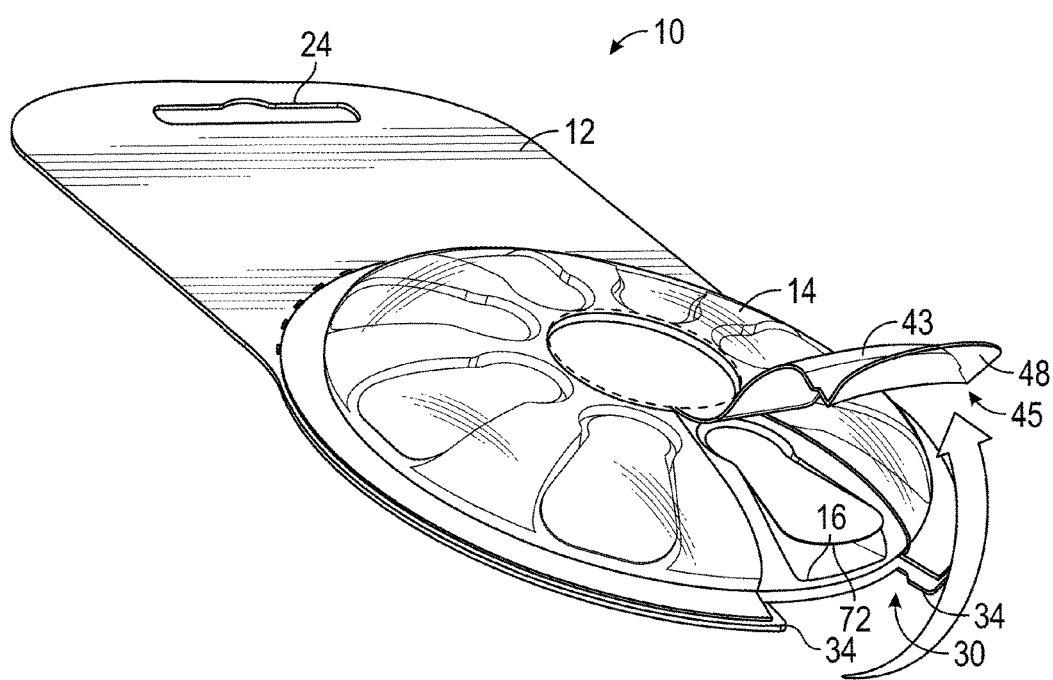
FIG. 7 is a front perspective view of the battery pack of FIG. 1 illustrating a door opened to allow access to a battery.

Referring to FIG. 7, when a receptacle 50 in which the tab 70 and attached battery 18 are received is aligned with the opening 45 in the cover 14 and the door 43 is opened, the stiffness of the material forming the tab 70 causes the free end 72 of the tab to spring forward, away from the tray 16. The tab 70 "sits up" and is therefore more accessible for a user to grasp the tab 70 and remove the attached battery 18. The clearance between the tab 70 and the tray 16 facilitates the removal of the tab 70 and attached battery 18 from the tray 16 by a user, making it easier for the user to grasp the free end 72 of the tab 70 and remove the battery 18 from the receptacle 50. The domed shape of the cover 14 and the tray 16 housed beneath the cover 14 provides for a convenient removal of the battery 18 by the user. Because the door extends from the front portion 40 of the cover 14 through the sloped transition portion 44 and to the circumferential flange 42, the opening 45 allows access to the battery 18 and the tab 70 not only from the front surface of the pack 10 but also laterally, from the bottom peripheral edge of the pack 10.

In use, with reference to FIGS. 1-7, the tray 16 is rotated about the axis of rotation 52 until a battery 18 and tab 70 contained in a receptacle 50 of the tray 16 is aligned with the door 43 (e.g., through the interaction between the one or more protrusions 66 and the corresponding indexing apertures 28). A user engages the door 43 using a finger, and frees the door 43 such that it may move relative to the cover about the living hinge 46. Initially, this may involve severing tack points or other fastening means used to initially fix the edges of the door 43 to the cover 14. The user then removes the battery 18 from the receptacle 50 by grasping the tab 70. The pack 10 is closed by pivoting the door 43 about the hinge 46 to the closed position in which the distal end 48 of the door passes into the cutout 30 and is retained by the tabs 34. The tabs 34 hold the door 43 in the closed position until another battery 18 is desired, and the user repeats the process. The user is able to grasp the peripheral or outer edge of the pack 10 with one hand while twisting the central boss 60 of the tray via the grip features 68 with a second hand from the back side of the battery pack 10. This arrangement allows the user to view the batteries 18 throughout the process of advancing a battery 18 into the removal position.

Figure 8:
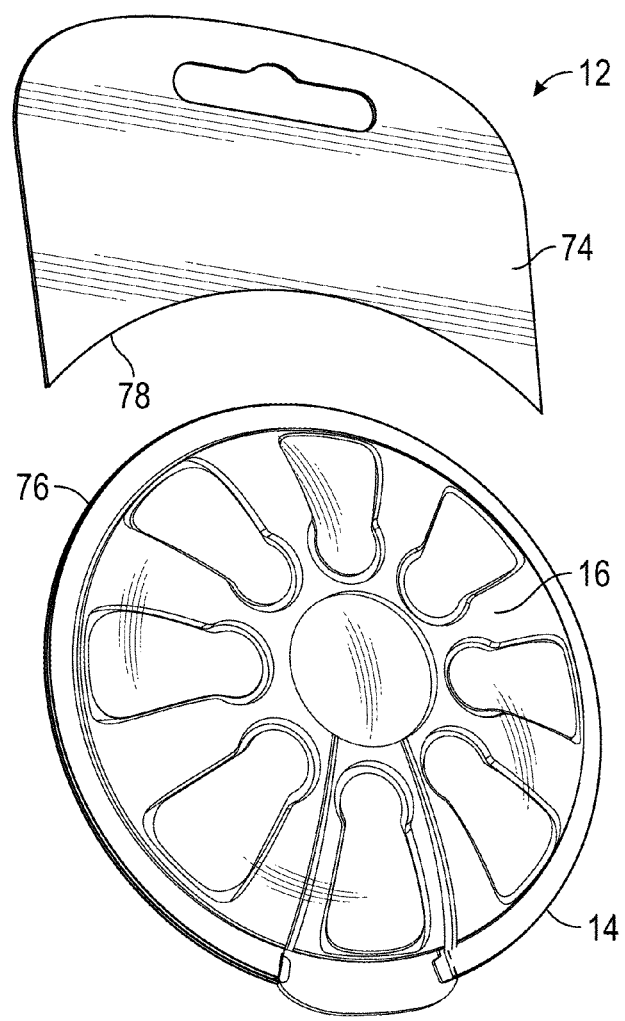
FIG. 8 is a front perspective view of the battery pack of FIG. 1 illustrating a portion of a backer card removed.

Referring to FIG. 8, according to an exemplary embodiment, a portion of the card 12 may be removable. For example, a top portion 74 of the card 12 may be detachable from a bottom portion 76 of the card 12 coupled to the cover 14 and the tray 16 along a curved perforation 78. As illustrated, the curved perforation 78 is a portion of a circle. In other embodiments it may be otherwise shaped (e.g., linear). The curved perforation 78 allows for a compact sized removable portion of the battery pack 10 by matching the shape of the card 12 following removal of the portion 74 with the shape of the cover 14. By removing the top portion 74 of the card 12, the remainder of the battery pack 10 provides a more discrete, compact package that may be more easily transported, such as in a pocket, handbag, suitcase, or other container. When stored in such a manner, the smooth, low profile shape of the cover 14 reduces the likelihood that the bottom portion 76 of the battery pack 10 will become snagged or caught on another object or open inadvertently. As shown in FIG. 1, the perforation 78 has a smaller diameter than the cover 14 so that the perforation 78 is located behind the flange 42 of the cover 14. The perforation 78 is located between the outer edge of the cover 14 and the axis of rotation 52. This ensures that the smooth outer edge of the cover 14 is located outside of the edge formed by the perforation 78 after the top portion 74 of the card 12 is removed to reduce the likelihood that the bottom portion 76 of battery pack 10 will become snagged or caught on another object or open inadvertently.

Referring to FIGS. 12-16 illustrate a battery pack 110 according to an exemplary embodiments. Many features of the battery pack 110 are similar to those of the battery pack 10 and will not be discussed in detail below. The battery pack 110 includes a card 112, a transparent cover or blister 114 that is fixed to the card 112, and a tray or dial 116 that is positioned between the card 112 and the cover 114 and is rotatable relative to the card 112 and the cover 114 about an axis of rotation 152. One or more button cell batteries 118 are received in the tray 116, and are contained beneath the cover 114.

Figure 12:
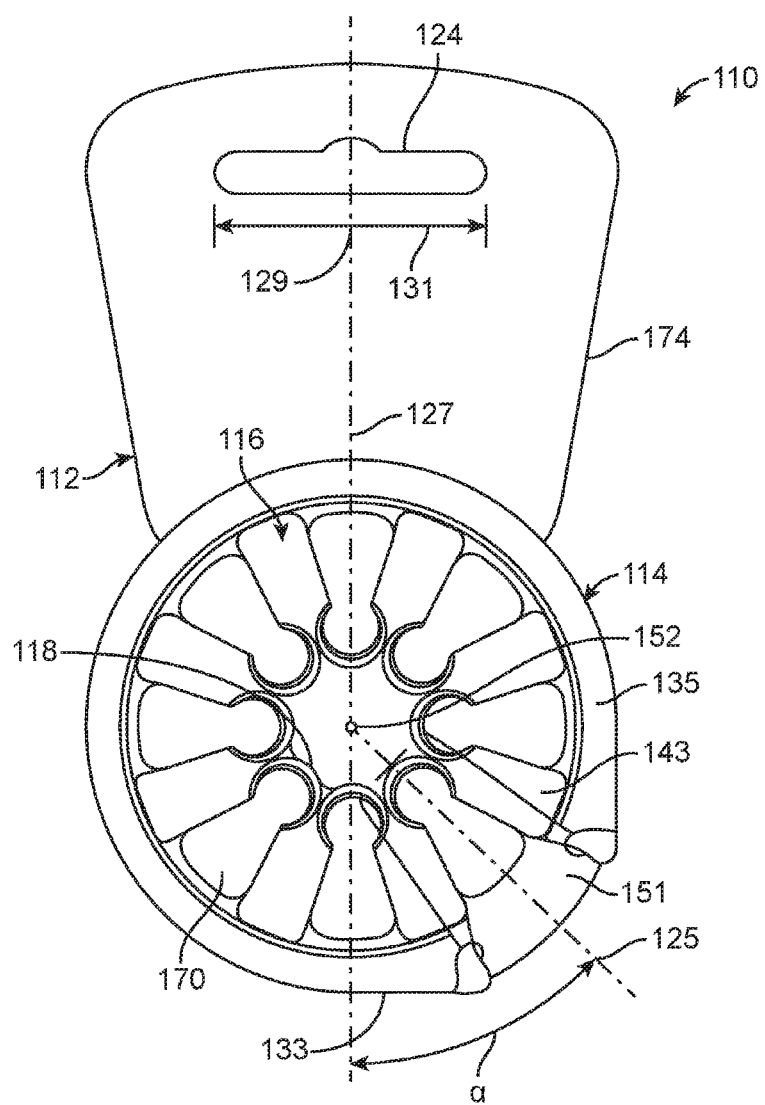
FIG. 12 is a front view of a battery pack, according to an exemplary embodiment.
Figure 13:
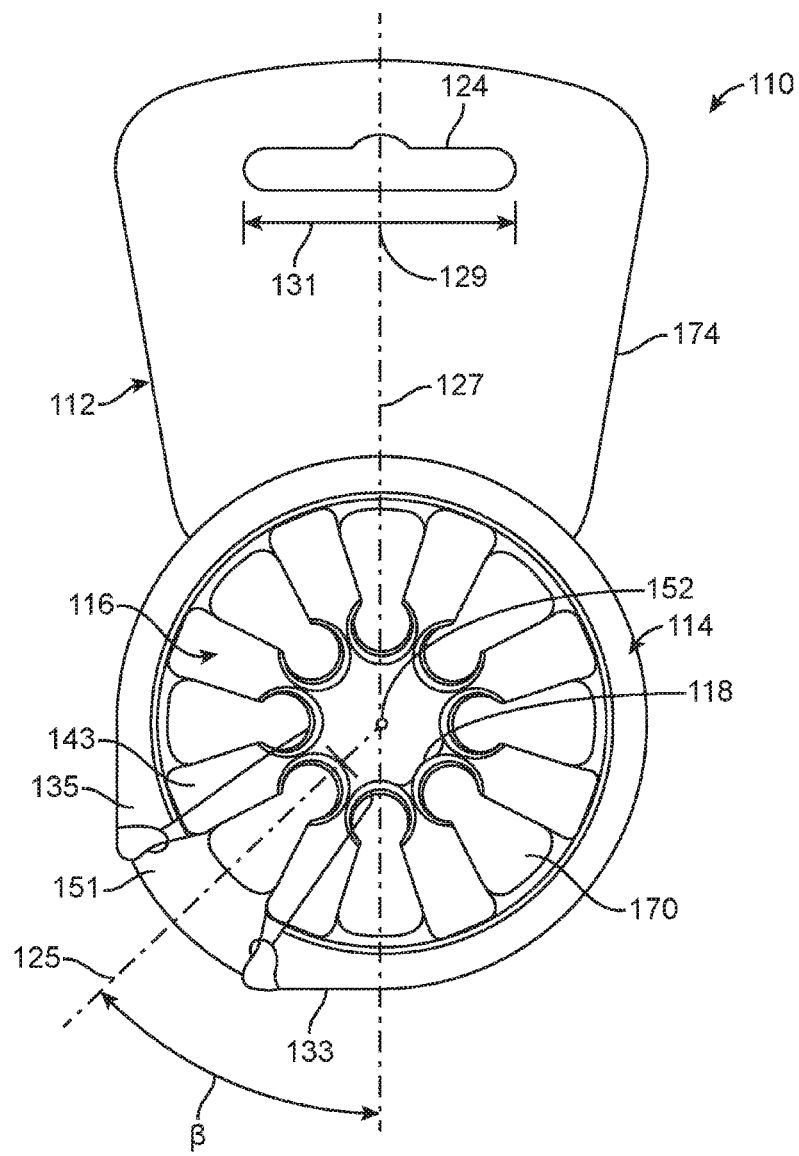
FIG. 13 is a front view of a battery pack, according to an exemplary embodiment.

As shown in FIG. 12, the door 143 of the cover 114 is located 45 degrees counterclockwise from the position of the door 43 of the cover 14 shown in FIG. 1. A center line 125 dividing the door 143 into halves is positioned at an interior angle α of 45 degrees relative to a plane 127 including the axis 152 and the midpoint 129 of the width 131 of the hanger slot 124. As shown in FIG. 13, the door 143 of the cover 114 is located 45 degrees clockwise from the position of the door 43 of the cover 114 shown in FIG. 1. The center line 125 dividing the door 143 into halves is positioned at an interior angle β of 45 degrees relative to a plane 127 including the axis 152 and the midpoint 129 of the width 131 of the hanger slot 124. In a coordinate system where the axis 152 is the z-axis and the y-axis is found in the plane 127, the door 143 is preferably located within a range of 135 degrees (FIG. 12) to 225 degrees (FIG. 13) relative to the z-axis (axis 152). The door 43 as shown in FIG. 1 is located at 180 degrees relative to the z-axis (axis 52). Positioning the door 143 at these locations increases the radial depth of the flange or latch 151 as compared to the latch 51 of the door 43. Also, the card 112 and the cover 114 are formed to include two straight edges 133 and 135 arranged perpendicularly to one another. These straight edges 133 and 135 help to increase the strength of the battery pack 110 when packed in a box or other container by providing an increased and flat contact area between the battery pack 110 and the surface of the container. In the embodiments of FIGS. 1, 12, and 13, the axis 52 or 152 is located between the door 43 or 143 and the removable top portion 74 or 174 of the card 12 or 112.

Figure 14:
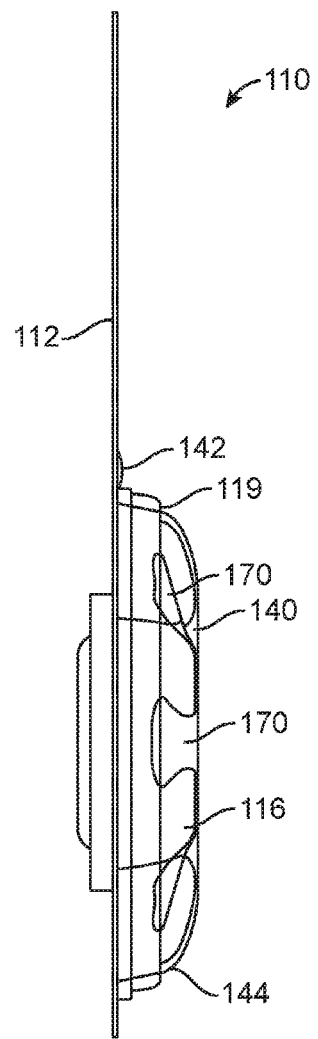
FIG. 14 is a side view of the battery pack of FIG. 12.

As shown in FIG. 14, the cover 114 is a dome-shaped body with a relatively flat front portion 140, an outer circumferential flange 142, and an annular transition portion 144 extending between the front portion 140 and the flange 142. The front portion 140 is substantially parallel to the card 112. The flange 142 is attached to the card 112, forming an internal volume between the cover 114 and the card 112 in which the tray 116 is disposed. The transition portion 140 includes a step, protrusion, or ledge 119 that extends around the circumference of the cover 114. The ledge 119 helps to guide the tabs 170 as the tray 116 is rotated. The bottom surface of the ledge 119 engages the upper surface of the tabs 170 so that the tabs 170 ride along the ledge 119 as the tray 116 is rotated. The contact between the bottom surface of the ledge 119 and the upper surface of the tabs 170 as the tray rotates helps to smooth the travel of the tabs 170 and limits jostling of the batteries 118 that can dislodge a battery 118 from a receptacle 150.

Figure 15:
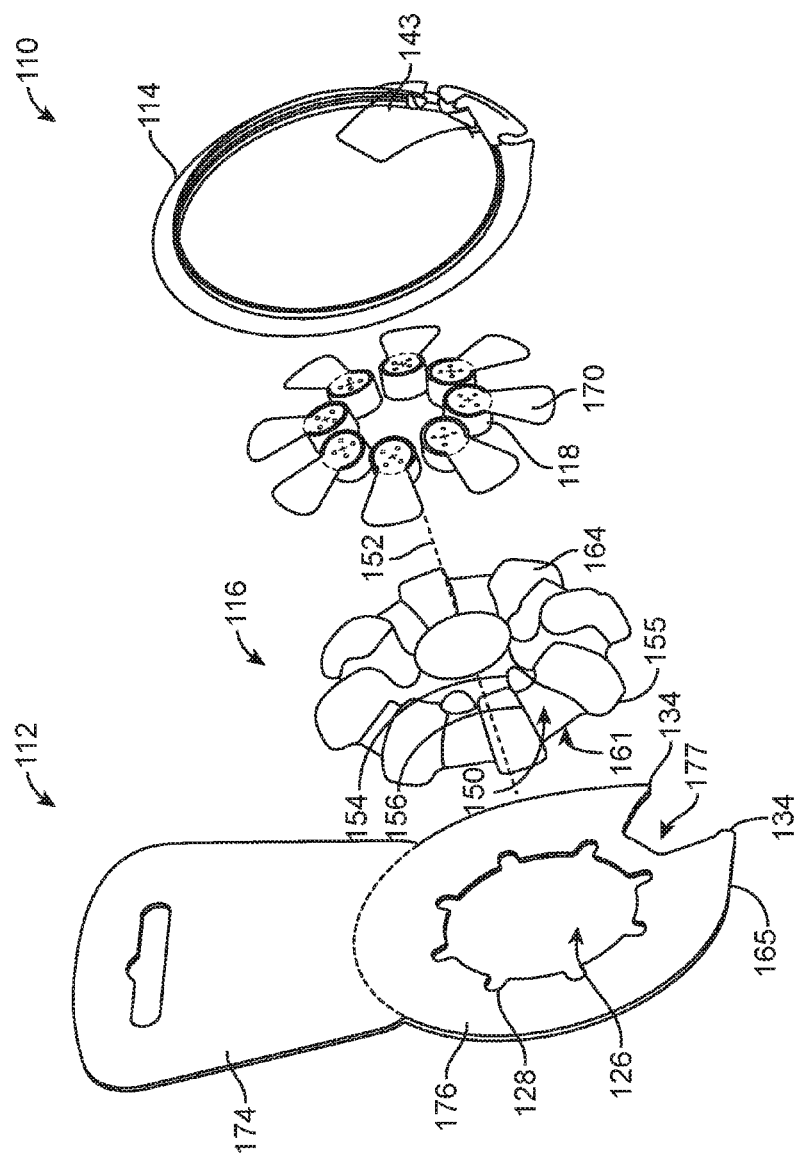
FIG. 15 is an exploded view of the battery pack of FIG. 12.
Figure 16:
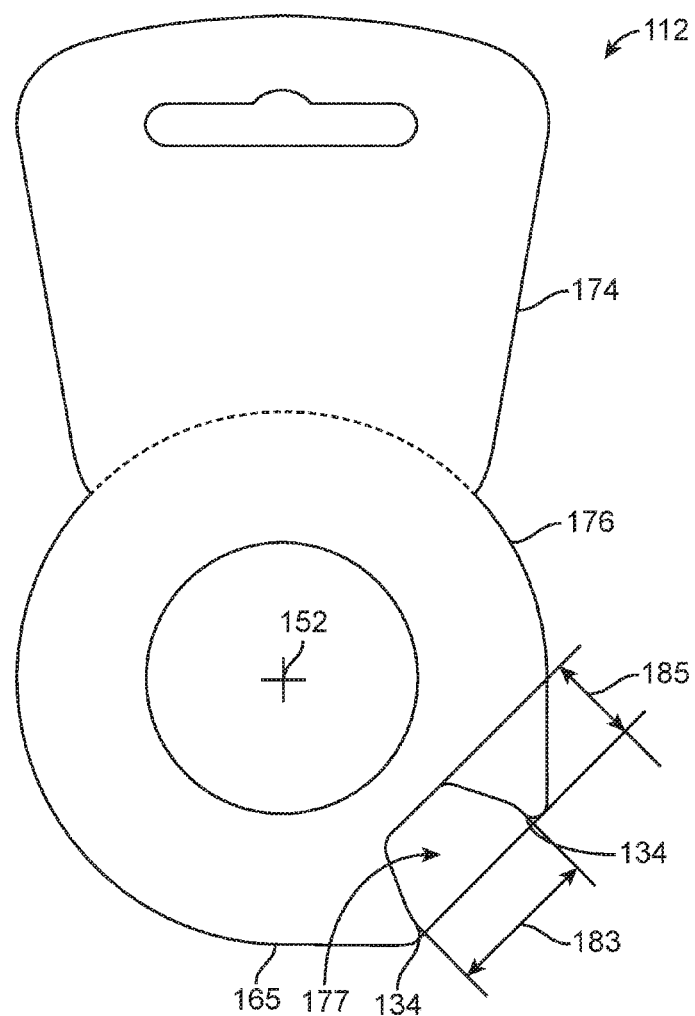
FIG. 16 is a front view of a card of the battery pack of FIG. 12.

As shown in FIG. 15, the body of the battery pack 110 (i.e., the components other than the batteries 118 and the tabs 170) consists of three pieces—a polymer card 112, the cover 114, and the tray 116. The tray 116 includes multiple battery receptacles 150 including a cylindrical portion 154 and a wedge-shaped portion 156. The outer or peripheral edge or circumference 155 of the tray 116 is recessed by a recess or cutout 161 at each receptacle 150. The cutout 161 results in the radius of the tray 116 (relative to the axis of rotation 152) at each receptacle 150 being less than the radius of the tray 116 between adjacent receptacles 150. The cutout 161 provides access to a user's finger to the tab 170. The bottom portion 176 of the card 112 includes a recess or cutout 177 in the outer edge 165 of the card 112 that is aligned with the door 143 of the cover 114 at the battery removal position. As shown in FIG. 16, the cutout 177 has a width 183 and a depth 185. Preferably, the width 183 is greater than 15 millimeters. The width of doors providing access to conventional battery packs may be only about 9 millimeters. The increased width 183 provides easier access to a finger (including the thumb) of a user, making it easier to remove a battery from the battery pack 110. Also, the inclusion of the cutout 161 in the tray 116 and the cutout 177 in the card 112 makes the receptacle 150 aligned with the door 143 open for access by the user when the door 143 is open in three directions—from above through the space occupied by the door 143 when closed, from the side through the space occupied by the door 143 when closed and through the cutout 161 in the peripheral edge 155 in the tray 116, and from below through the cutout 177 in the card 112 and through the cutout 161 in the tray 116. The three directions of access provide an arc of access from above to below of greater than 90°. This improves user access to the receptacle 150 aligned with the door 143 and the battery 118 it contains as compared to known battery packages that only provide access to a battery from a single direction (e.g., from the back side of a tray). The polymer card 112 provides locking tabs 134 that do not lose shape or otherwise become damaged due to repeated latching and unlatching of the door 143. The indexing apertures 128 are formed as notches in the opening 126 through the card 112 for receiving a portion of the tray 116 to allow the tray 116 to rotate about the axis 152 relative to the card 112.

Figure 17:
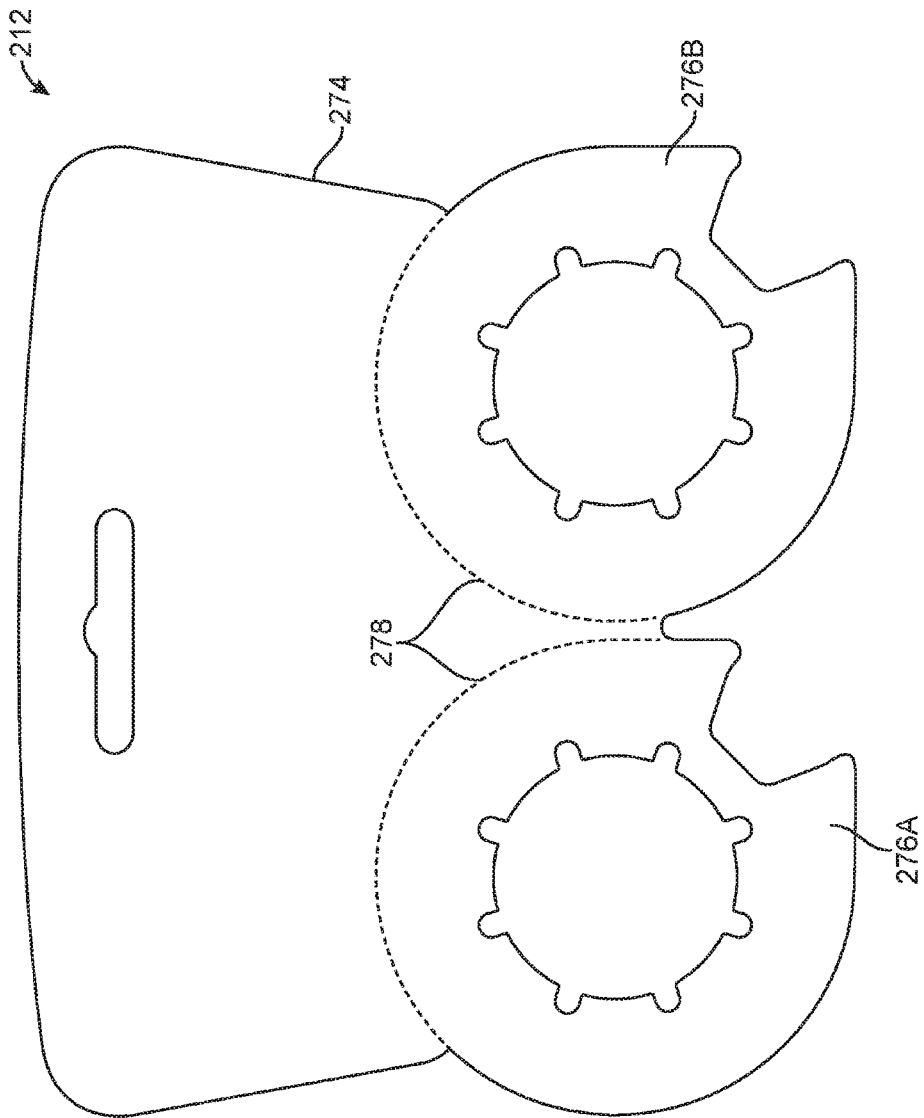
FIG. 17 is a front view of a card of a battery pack, according to an exemplary embodiment.

Referring to FIG. 17, a card 212 for a battery pack is illustrated according to an exemplary embodiment. The card 212 includes two portions 276A and 276B that are removable from the portion 274. Curved perforations 278 separate the portions 276A and 276B from the portion 274. The card 212 thereby provides two battery packs.

Figure 18:
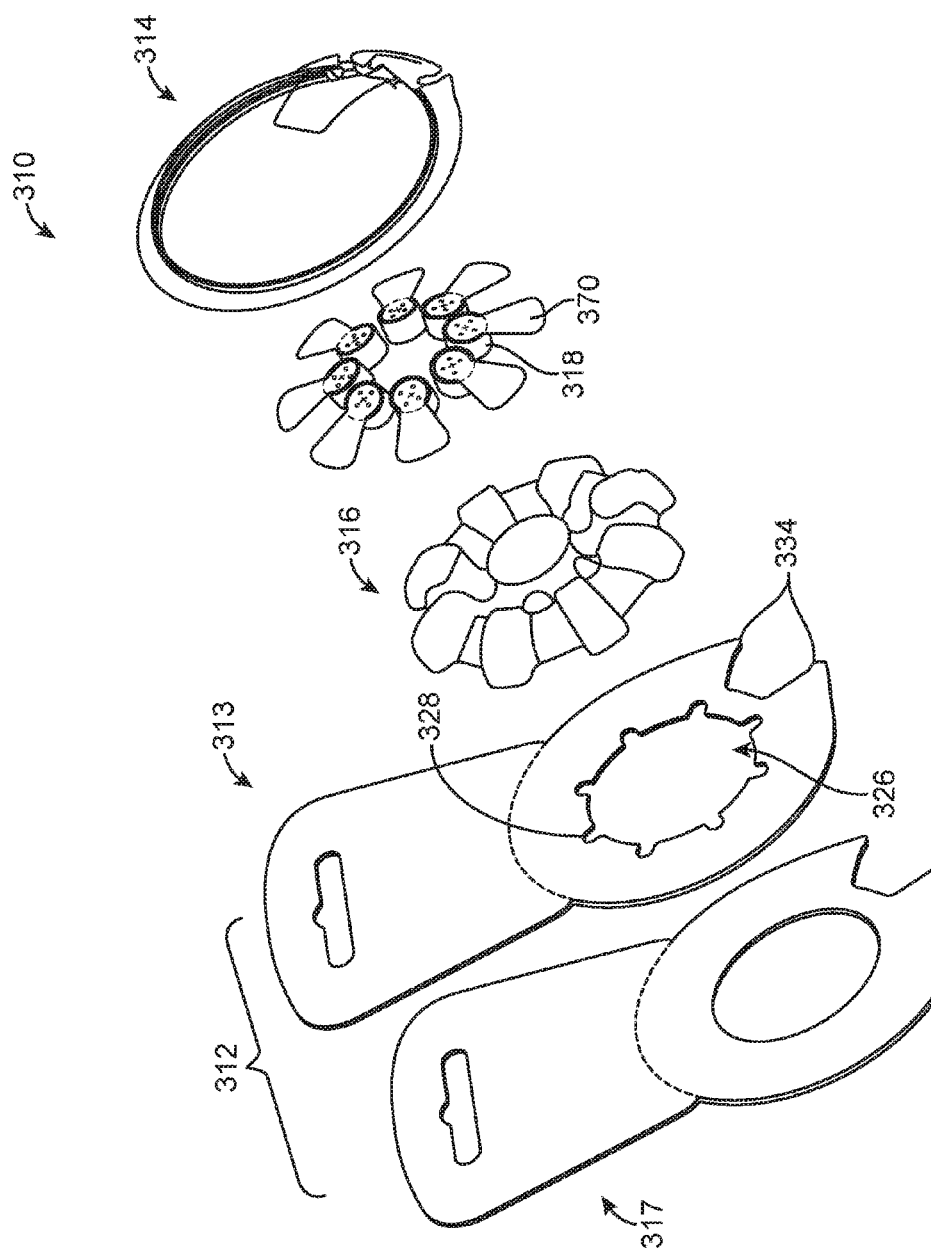
FIG. 18 is an exploded view of a battery pack, according to an exemplary embodiment.

Referring to FIG. 18, a battery pack 310 is illustrated according to an exemplary embodiment. The body of the battery pack 310 (i.e., the components other than the batteries 318 and the tabs 370) consists of four pieces—a card 312 having a polymer layer 313 and a paper layer 317, the cover 314, and the tray 316. The polymer layer 313 provides additional strength to the paperboard layer 317, particularly for the locking tabs 334 and the index apertures 328. As illustrated, the indexing apertures 328 are formed as notches in the opening 326. In some embodiments, the polymer layer 313 includes a top portion 374 and a bottom portion 376 that can be separated from one another. In other embodiments, the polymer layer 313 only includes the bottom portion 376 and thereby provides the additional strength for the locking tabs 334 and the index apertures 328 while eliminating the material needed for the top portion 374. The polymer layer 313 is attached to the paperboard layer 317 (e.g., by ultrasound welding, heat welding, adhesive, etc.).

Figure 19:
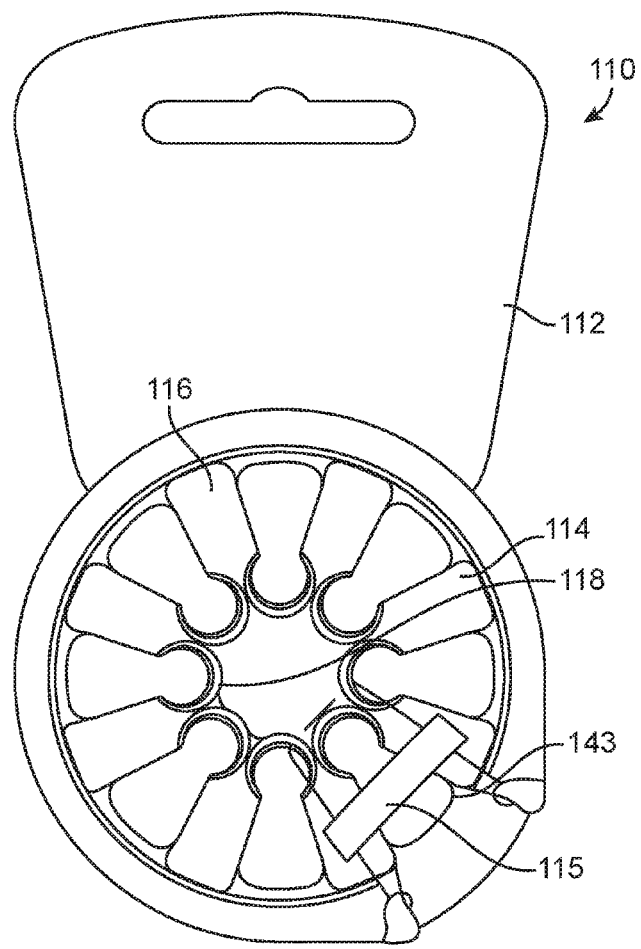
FIG. 19 is a front view of the battery pack of FIG. 12 including a tamper evidence adhesive strip.
Figure 20:
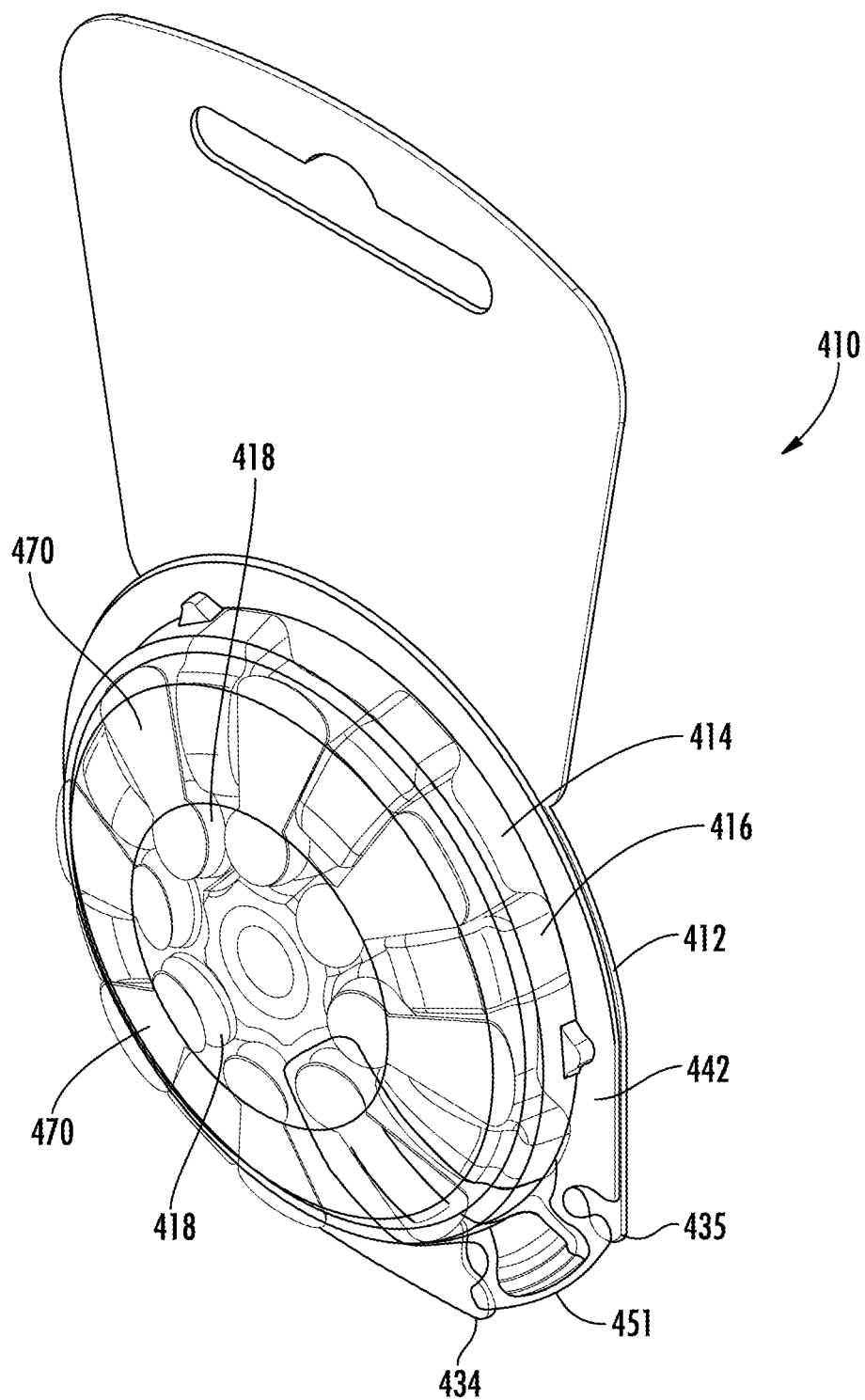
FIG. 20 is a front perspective view of a battery package, according to an exemplary embodiment.

Referring to FIG. 19, a tamper evidence adhesive strip 115 is attached across the door 143 to the portions of the cover 114 adjacent the door 143. The strip 115 extends across the door 143 and is attached to the door 143 and the portions of the cover 114 adjacent the door 143. When the door 143 is opened for the first time, the strip 115 breaks to indicate that the door 143 has been opened. In a retail environment, a broken strip 115 indicates tampering with the battery pack 110 by showing the retailer that someone has opened the door 143 without paying for the battery pack 110 (e.g., in an attempt to steal one or more batteries 118 from the battery pack 110).

As shown in FIGS. 20-31, a battery package 410 is illustrated according to an exemplary embodiment. The battery package 410 includes a card 412, a blister or cover 414, and a dial or tray 416. Many features of the battery package 410 are similar to those of the battery packs 10, 110, and 310 and will not be discussed in detail below. Similar features are identified with the same names used above.

Figure 23:
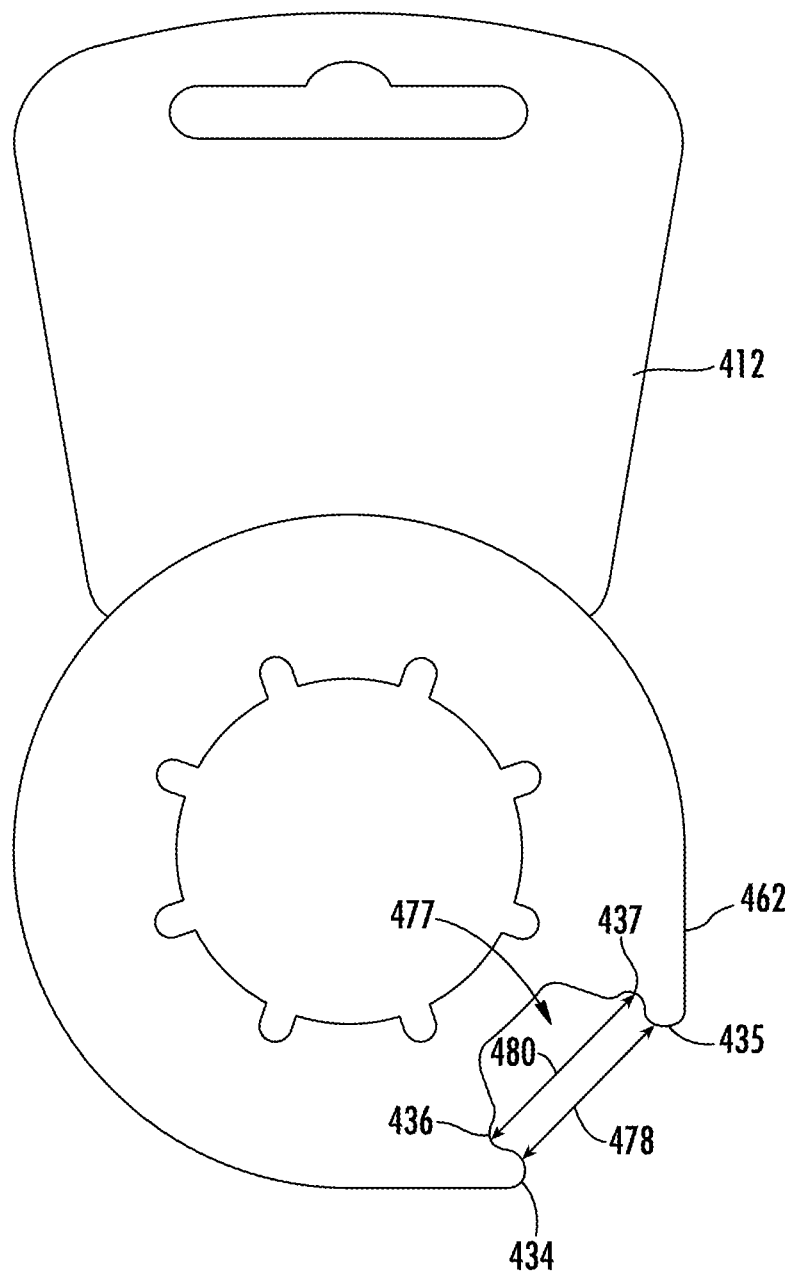
FIG. 23 is a front view of a card of the battery package of FIG. 20.

Referring to FIG. 23, the card 412 is made from a polymer. The polymer may be of various types of including Polyethylene terephthalate glycol (i.e., PETG), polyvinyl chloride (i.e., PVC), or other plastics. The cover 414 is also made from a polymer. The polymer may be of various types of including Polyethylene terephthalate glycol (i.e., PETG), polyvinyl chloride (i.e., PVC), or other plastics. In a preferred embodiment, the card 412 and the cover 414 are both made from PETG, which improves the bond between the card 412 and the cover 414 when they are secured to one another (e.g., by thermal or ultrasonic bonding).

The card 412 includes a recess 477 formed in the outer edge 462 of the card 412. The recess 477 is aligned with the door 443 and the opening 426 at the battery removal position. The recess 477 is defined in part by a pair of locking tabs 434 and 435, each of which is located adjacent to one of a pair of card cutouts 436 and 437. The recess 477 has a recess width 478 measured at the closest points between the two locking tabs 434 and 435. The pair of card cutouts 436 and 437 are separated from each other by a cutout width 480 measured at the furthest points between the two card cutouts 436 and 437. The cutout width 480 is greater than the recess width 478.

Figure 22:
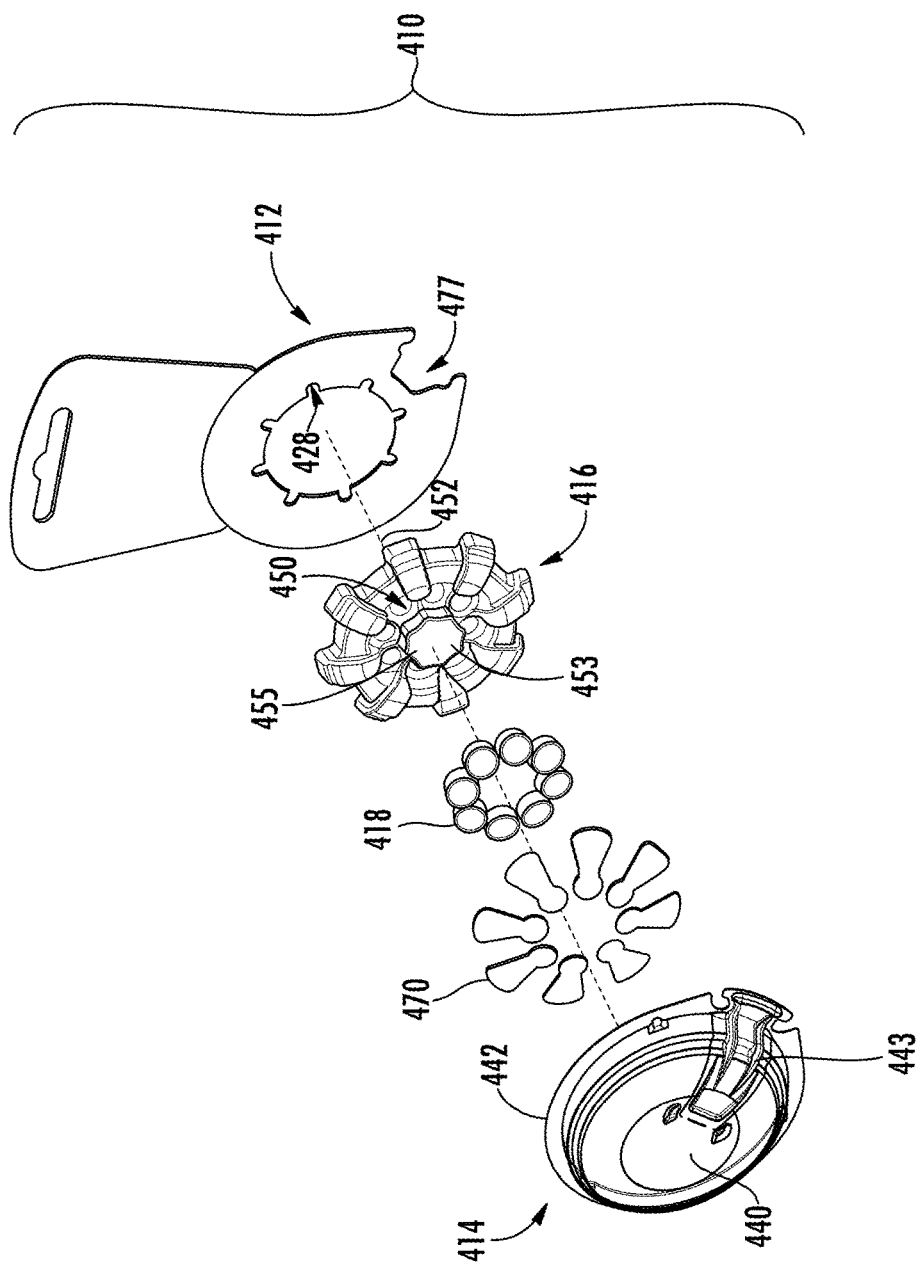
FIG. 22 is an exploded view of the battery package of FIG. 20.

Referring to FIG. 22, the tray 416 includes multiple battery receptacles 450. The receptacles 450 surround a central post or pillar 453. As shown, eight receptacles 450 are arranged symmetrically around the post 453. In other embodiments, more or fewer receptacles 450 are provided (e.g., four receptacles, six receptacles, ten receptacles, twelve receptacles). The axis of rotation 452 extends through the post 453. As shown, the axis of rotation 452 is perpendicular to the front surface 455 of the post 453.

Figure 24:
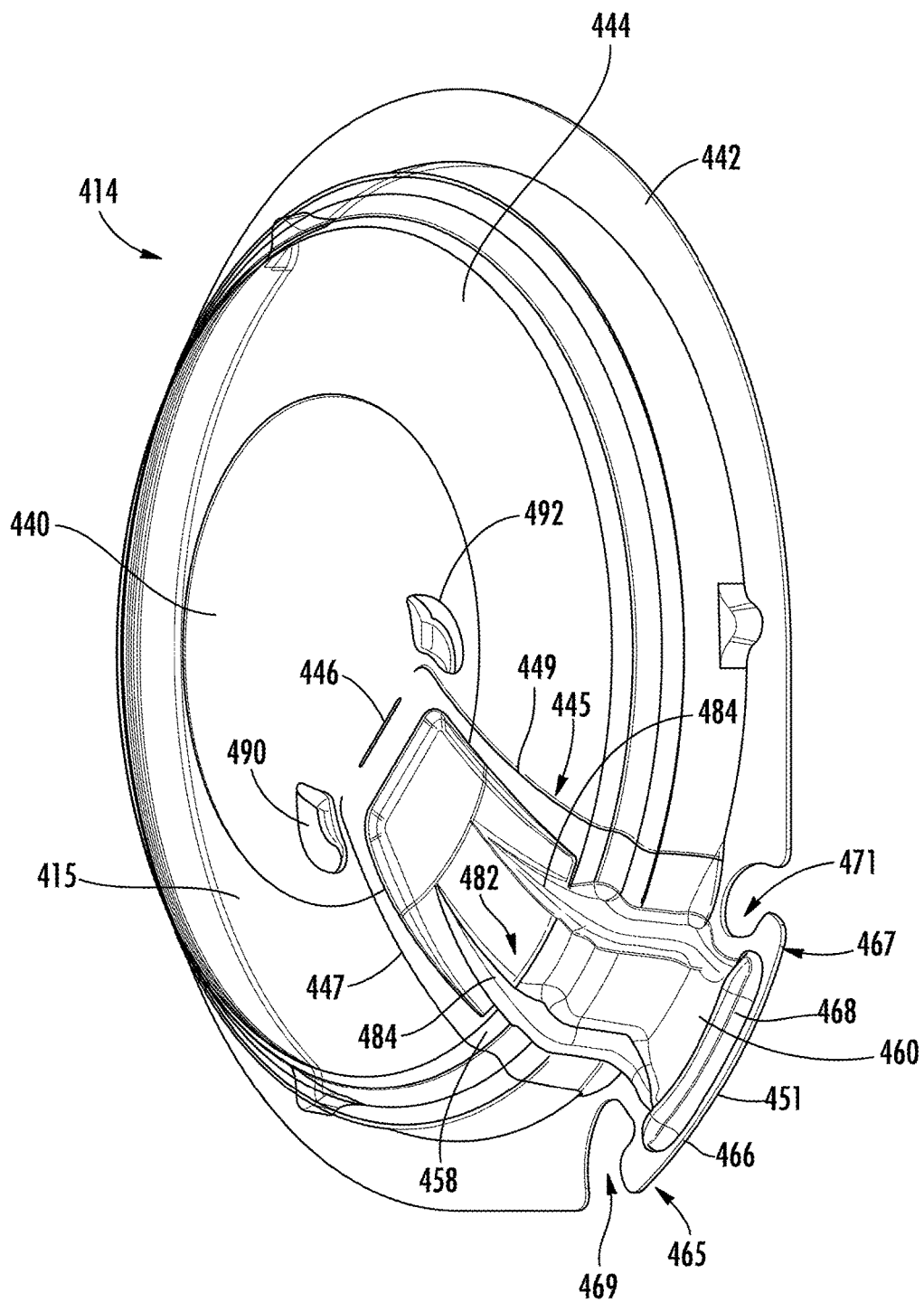
FIG. 24 is a front perspective view of a cover of the battery package of FIG. 20.

Referring to FIG. 24, the cover 414 is a dome-shaped body 415 with a front portion 440, an outer circumferential flange 442, and an annular transition portion 444 extending between the front portion 440 and the flange 442. As illustrated, the front portion 440 is substantially flat and is substantially parallel to the card 412. In other embodiments, the front portion 440 may be curved.

Figure 25:
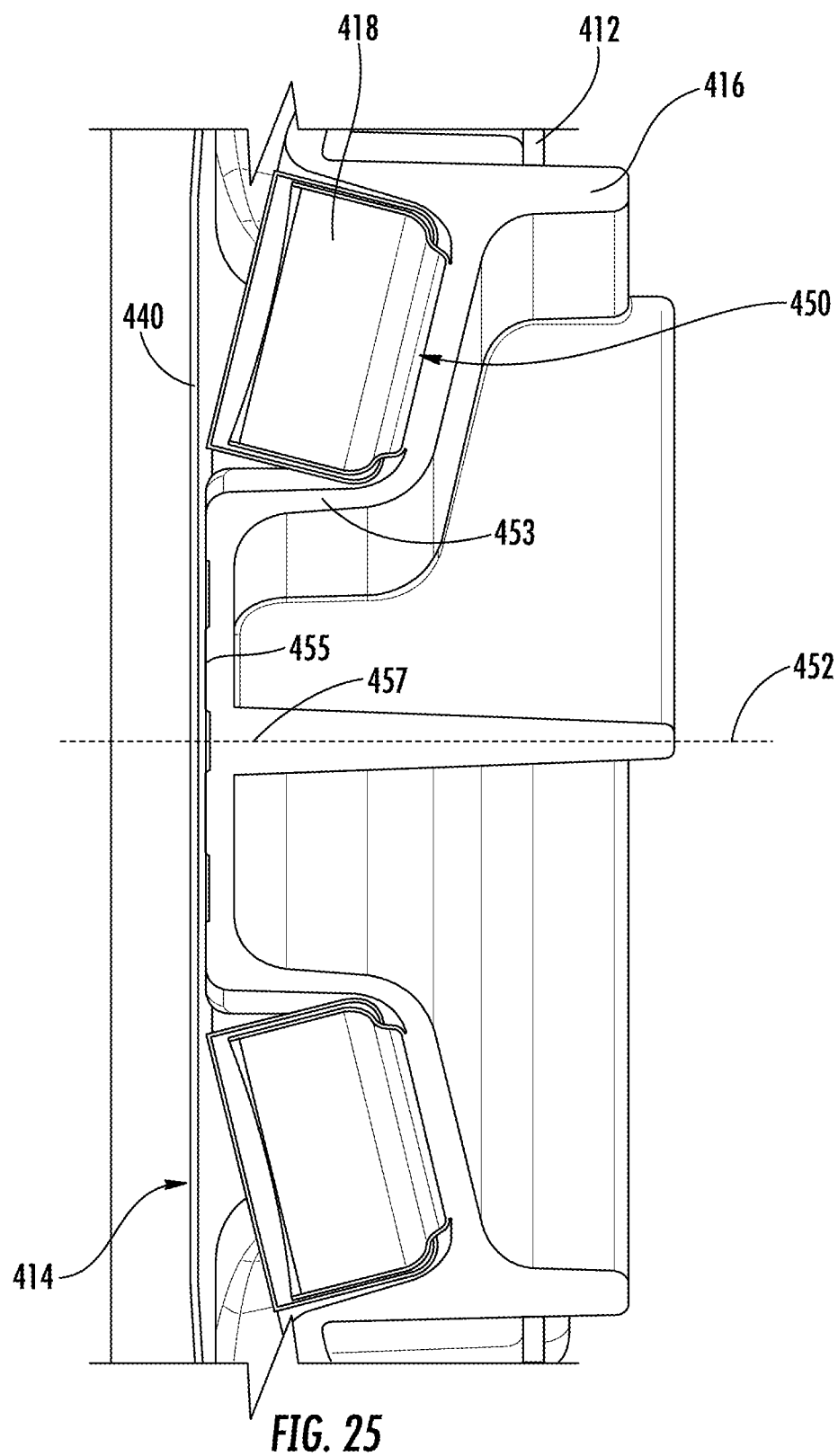
FIG. 25 is a section view of the battery package of FIG. 20, along line 25-25 in FIG. 21.

Referring to FIG. 25, the front portion 440 is spaced apart from the front surface 455 of the post 453 of the tray 416 by a distance 457. The distance 457 provides a gap or space between the front portion 440 of the cover 414 and the central post 453 of the tray 416. This gap allows the tray 416 to travel slightly within the volume defined by the cover 414 and the card 412 while still allowing for easy rotation of the tray 416. The gap also allows for imperfections in manufacturing of the tray 416. For example, if one or more portions of the tray 416 is warped or otherwise curved (i.e., not flat), the protrusions of the tray 416 may not engage consistently with the indexing apertures 428 formed in the card 412. By providing the gap, any slight imperfections in the tray 416 or the cover 414 do not affect operation and rotation of the tray 416. In a preferred embodiment, the distance between the front surface 455 of the post 453 of the tray 416 and the interior surface of the front portion 440 of the cover 414 is 0.015 inch (0.381 millimeter).

Figure 26:
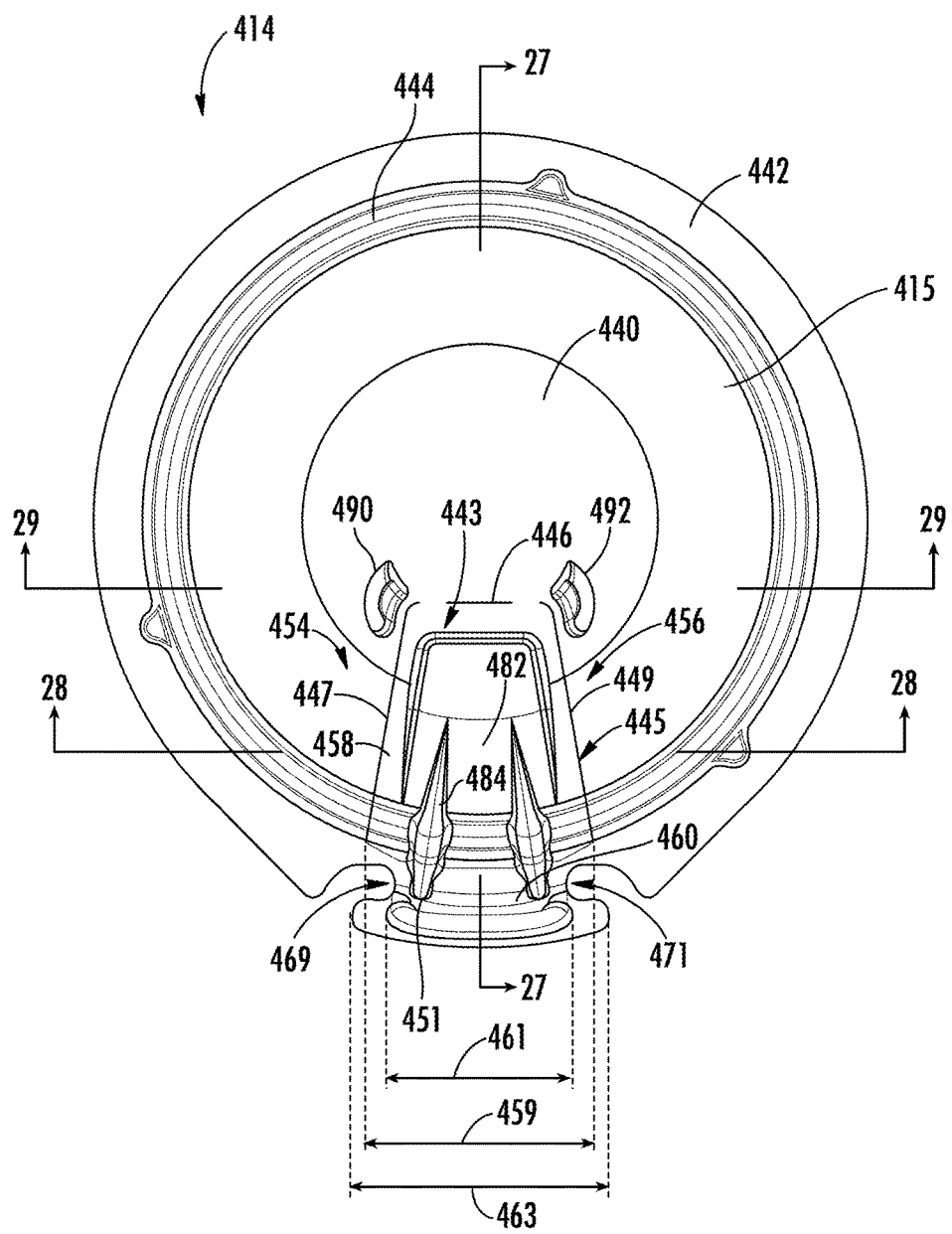
FIG. 26 is a front view of the cover of FIG. 24.

Referring to FIG. 26, the body 415 has an opening 445 defined in part by two spaced apart opening sides 447 and 449 with a first portion 454 of the body 415 adjacent the first opening side 447 and a second portion 456 of the body 415 adjacent the second opening side 449. The door 443 is pivotally attached to the body 415 by a hinge 446 so that the hinge 446 connects the two opening sides 447 and 449. The opening 445 and the door 443 are aligned with the recess 477 in the card 412 at the battery removal position.

The door 443 also includes a main portion or base 458, a neck 460, and a latch 451 located at the distal end of the door 443 from the hinge 446 with the neck 460 connecting the base 458 to the latch 451. The neck 460 is narrower in width than the base 458 and the latch 451. The maximum base width 459 is greater than the maximum neck width 461 and the maximum latch width 463 is also greater than the maximum neck width 461. The maximum latch width 463 is also greater than the recess width 478 of the recess 477 of the card 412.

Figure 21:
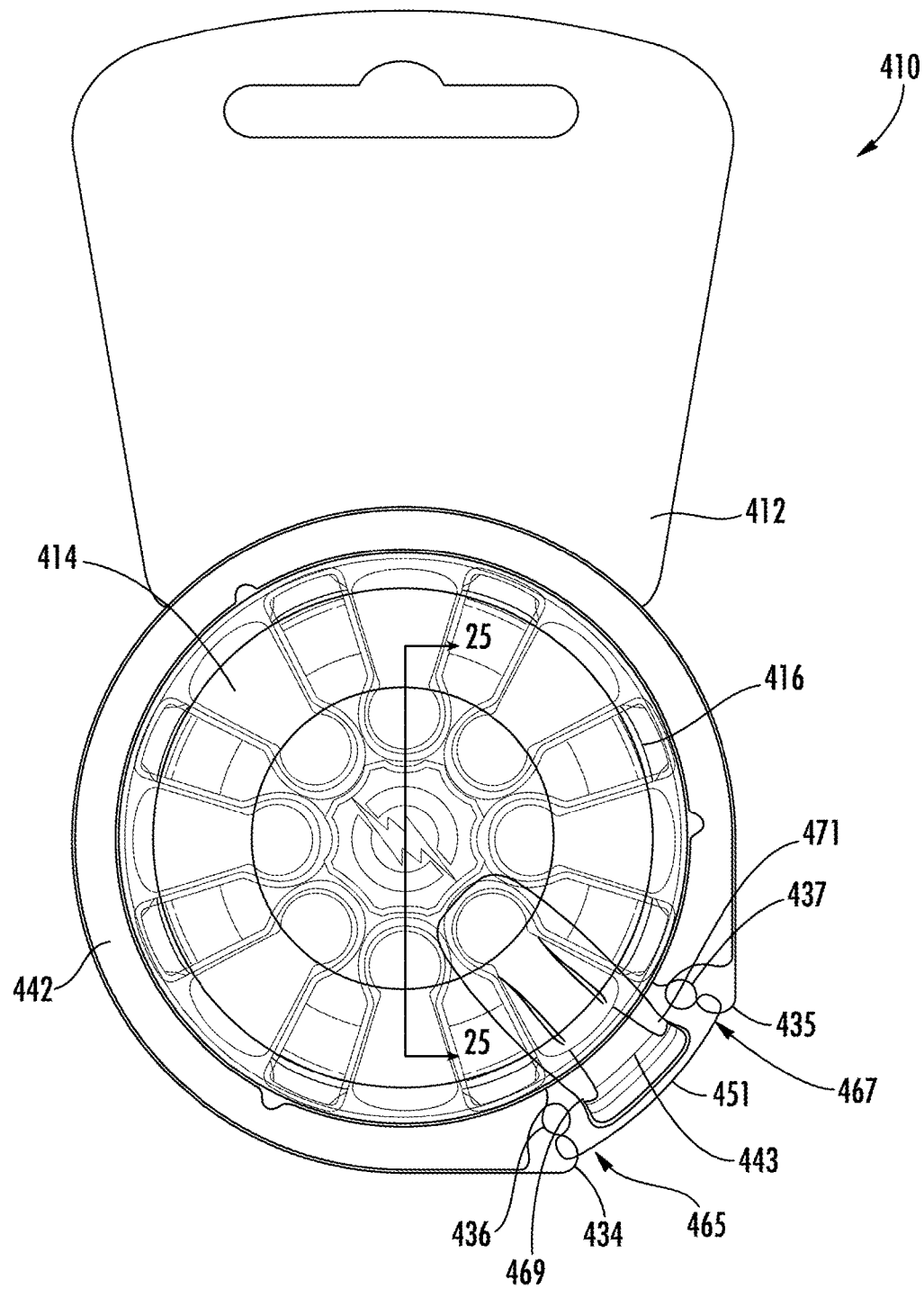
FIG. 21 is a front view of the battery package of FIG. 20.

Referring to FIG. 21, the door 443 is movable between an open position to provide access to the opening 445 and a closed position in which the door 443 closes the opening 445 and the latch 451 engages both of the locking tabs 434 and 435 of the card 412 to secure the door 443 in the closed position. The latch 451 includes two end portions 465 and 467 located opposite from each other so that with the door 443 in the closed position each end portion 465 or 467 of the latch 451 is located beneath one of the two locking tabs 434 and 435 of the card 412 to secure the door 443 in the closed position. With the door 443 in the closed position, each end portion 465 or 467 of the latch overlaps a portion of one of the locking tabs 434 and 435. The overlapping regions found at the end portions 465 and 467 of the latch 451 help to ensure a secure latch of the door 443 to the card 412 thereby securing the door 443 in the closed position.

Figure 27:
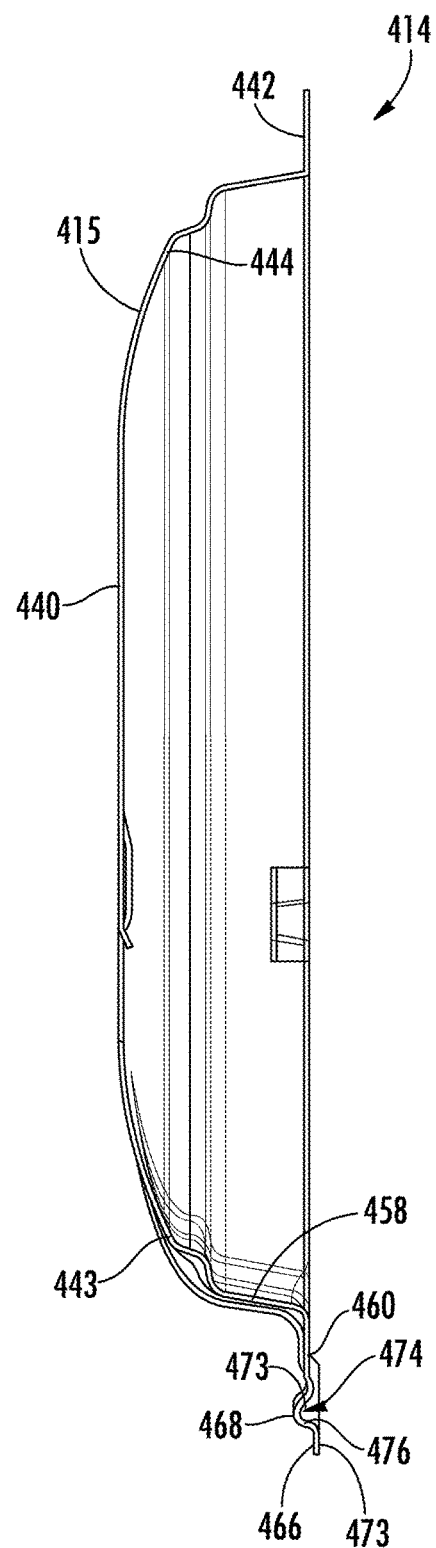
FIG. 27 is a section view of the cover of FIG. 24, along line 27-27 of FIG. 26.

Referring to FIG. 27, the latch 451 has an outer portion 466 and a ridge 468 extending away from the outer portion 466 with the rear surface 472 of the ridge 468 spaced apart from the rear surface 473 of the outer portion 466 to define a grasping recess 474. The ridge 468 also defines a wall or ledge 476 located on the rear side of the latch 451 adjacent the grasping recess 474 configured to assist a user in grasping the latch. The grasping recess 474 and the ledge 476 are each configured to assist a user in grasping the latch 451. When the user reaches a finger underneath the door 443, the grasping recess 474 provides room for the user to curl her fingertip under the door and the ledge 476 provides a contact point for the user's fingertip and/or fingernail to gain purchase on the door 443. Improving the ability of the user is particularly important when the battery package 410 contains hearing aid batteries which are frequently used by the elderly. The elderly may have difficulty manipulating or clearing seeing the door 443 and the recess 474 and ledge 476 help with grasping the latch 451 and also provide tactile feedback to the user that her finger is in the proper position on the latch to open the door 443.

Referring to FIG. 26, a pair of door cutouts 469 and 471 separate the latch 451 from the base 458 of the door 443. Referring to FIG. 21, with the door 443 in the closed position, the first card cutout 436 is aligned with the first door cutout 469 and the second card cutout 437 is aligned with the second door cutout 471. During assembly of the battery packaging 410, the aligned cutouts function as through holes that receive pins to position and properly align the card 412 and the cover 414 relative to one another.

Figure 28:
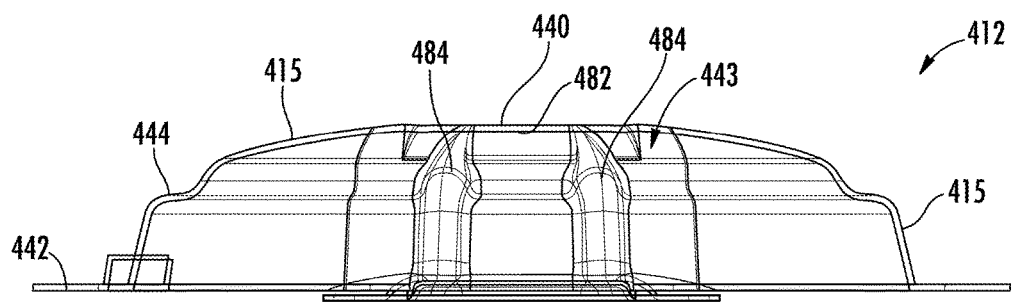
FIG. 28 is a section view of the cover of FIG. 24, along line 28-28 of FIG. 26.
Figure 29:
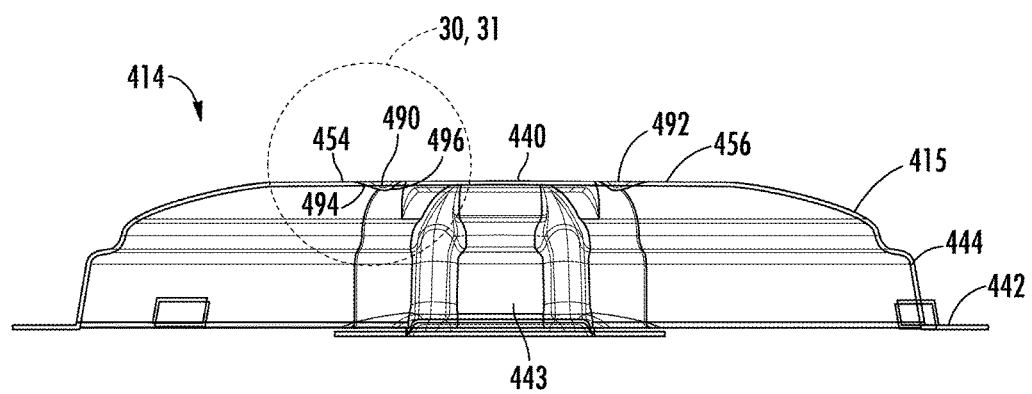
FIG. 29 is a section view of the cover of FIG. 24, along line 29-29 of FIG. 26.

Referring to FIG. 28, the door 433 includes a surface 482 recessed from the adjacent portions of the door 443 with the surface 482 is recessed toward the tray 416. The recessed surface 482 helps provide rigidity and strength to the door 443. The door 443 also includes two gussets or ridges 484 extending radially along the door 443 in the direction between the hinge 446 and the latch 451. The ridges 484 also help to provide rigidity and strength the door 443. In some embodiments, the recessed surface 482 and the ridges 484 are omitted. In other embodiments, more or fewer ridges 484 are included. Some embodiments include a recessed surface 482, but no ridges 484 and other embodiments include one or more ridges 484, but no recessed surface 482.

Referring to FIGS. 26 and 29-31, the cover 414 also includes a transition protrusion 490 extending from the rear side of the body 415 toward the card 412. The transition protrusion 490 is located in the first portion 454 of the body 415. A second transition protrusion 492 also extends from the rear side of the body 415 toward the card 412. The transition protrusion 492 is located in the second portion 456 of the body 415.

Both of the transition protrusions 490 and 492 are arranged similarly so only the transition protrusion 490 will be described in detail. The transition protrusion 490 includes a leading surface 494 and a trailing surface 496 located closer to the battery removal position than the leading surface 494. The transition protrusions 490 and 492 are curved, angled, or otherwise profiled from the bottom surface of the cover 414 toward the card 412.

Figure 30:
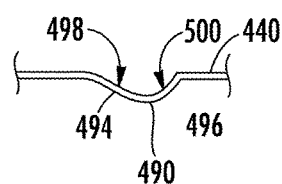
FIG. 30 is a detail view of the section view of the cover of FIG. 24.
Figure 31:
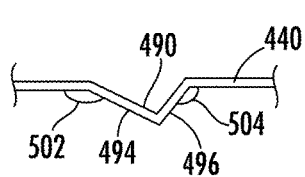
FIG. 31 is a detail view of the section view of the cover of FIG. 24 according to an alternative embodiment.

Referring to FIG. 30, the leading surface 494 and the trailing surface 496 are curved. As illustrated, the radius of curvature 498 of the leading surface 494 is less than the radius of curvature 500 of the trailing surface 496. In other embodiments, the radius of curvature 498 is the same as the radius of curvature 500. In other embodiments, the radius of curvature 498 is greater than the radius of curvature 500. Referring to FIG. 31, the leading surface 494 is angled at a leading angle 502 relative to the front portion 440 of the cover 414 and the trailing surface 496 is angled at a trailing angle 504 relative to the front portion 440. The leading angle 502 and the trailing angle 504 are exterior angles measured on the rear side of the cover 414. As illustrated, the leading angle 502 is greater than the trailing angle 504. In other embodiments, the leading angle 502 and the trailing angle 504 are the same. In other embodiments, the leading angle 502 is less than the trailing angle 504.

When the tray 416 is rotated relative to the card 412 and the cover 414 to selectively align one of the receptacles 450 with the opening 443 at the battery removal position, the battery 418 and the tab 470 of the battery 418 approaching the battery removal position contact and travel along one of the two transition protrusions 490 and 492. The transition protrusion 490 or 492 guides the battery 418 and its associated tab 470 toward one of the opening side 447 or 449 and the opening 445. This guidance helps to prevent the seat the battery 418 in its receptacle 450 and reduces the likelihood of the battery 418 and/or the tab 470 from catching or hanging up on one of the opening sides 447 and 449 or the edges of the door 443 as the battery 418 moves to the battery removal position.

Figure 32:
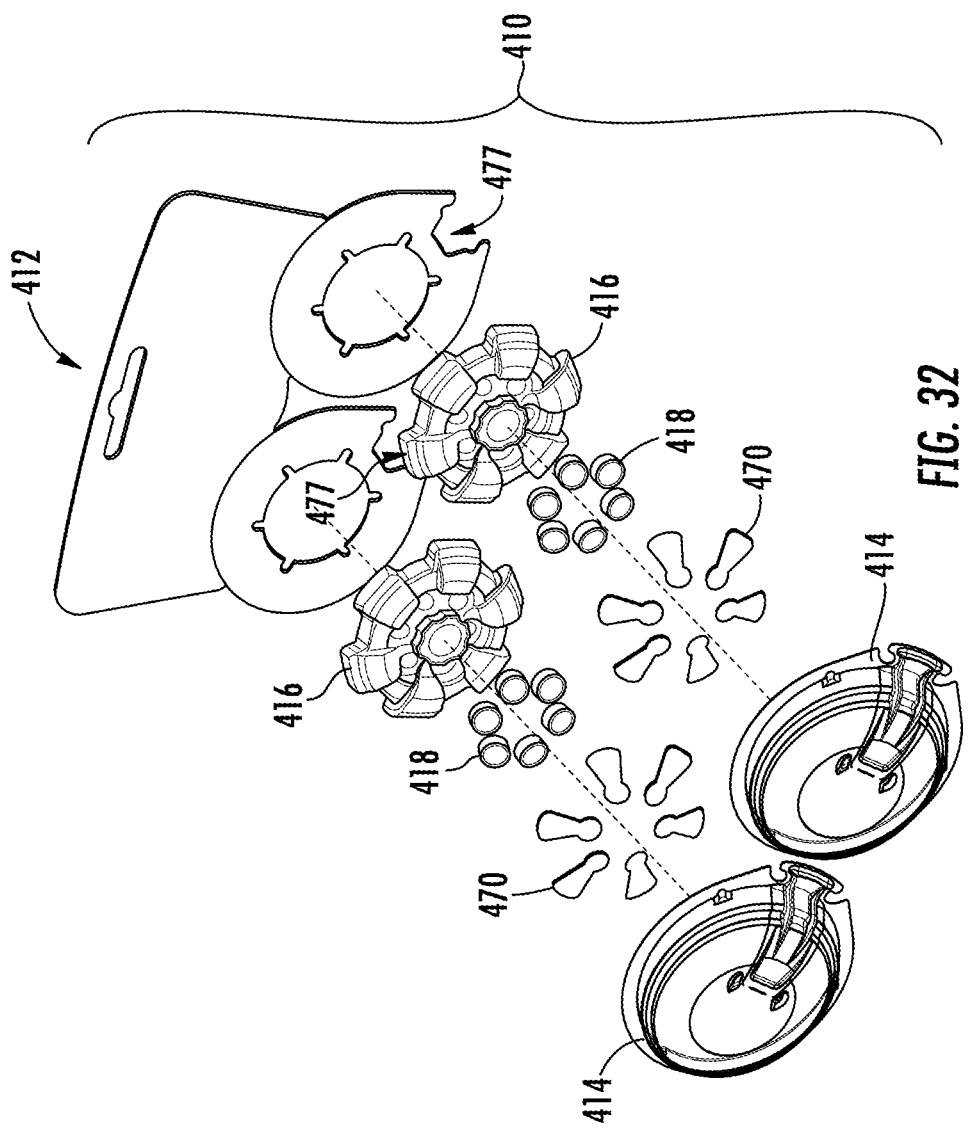
FIG. 32 is a front perspective view of a battery package, according to an exemplary embodiment.

Referring to FIG. 32, the battery package 410 is illustrated according to an exemplary embodiment that provides two battery packs from the main body of the card 412 in a manner similar to the card 212 described above.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., movable, removable, or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "front," "rear," "back," "axial," "radial," etc.) are used to describe the orientation of various elements as illustrated in the Figures.

It is important to note that the construction and arrangement of the battery package as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method of steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery package, comprising:
   a card;
   a cover attached to the card, the cover including a body having a front portion, an outer circumferential flange, and an annular transition portion extending between the front portion and the flange, the body includes an opening and a door, wherein the door is movable between an open position to provide access to the opening and a closed position in which the door closes the opening;
   a tray positioned between the card and the cover, the tray including a plurality of receptacles arranged symmetrically about a central post, wherein the front surface of the central post is spaced apart from the interior surface of the front portion of the cover by a distance;
   a plurality of batteries, each battery positioned within one of the plurality of receptacles; and
   a plurality of tabs, each tab removably attached to one of the batteries, wherein each tab is positioned between the cover and the battery to which the tab is attached;
   wherein the tray is rotatable relative to the card and the cover about an axis of rotation that extends through the central post to selectively align one of the receptacles with the opening in a battery removal position; and
   wherein with the door in the open position, the tab attached to the battery in the receptacle in the battery removal position is accessible through the opening from the front of the cover and the peripheral edge of the cover.

2. The battery package of claim 1, wherein the distance between the front surface of the central post and the front surface of the cover is 0.015 inch.

3. The battery package of claim 1, wherein the plurality of receptacles are formed in a front side of the tray and the tray includes a grip extending away from a rear side of the tray; and wherein the card includes an opening that the grip of the tray extends through so that a user may grasp the grip to rotate the tray.

4. The battery package of claim 1, wherein the card comprises a polymer.

5. The battery package of claim 4, wherein the tray and the card include a plurality of indexing features for indexing rotation of the tray to a plurality of predetermined positions.

6. The battery package of claim 4, wherein the cover comprises the polymer.

7. The battery package of claim 6, wherein the polymer is PETG.

8. A battery package, comprising:
a card including two locking tabs and a recess formed in the outer edge of the card, wherein the recess has a recess width measured at the closest points between the two locking tabs;
a cover attached to the card, the cover including:
a body having an opening, and
a door pivotally attached to the body by a hinge, wherein the opening and the door are aligned with the recess in the card, and wherein the door includes a base, a neck, and a latch located at the distal end of the door from the hinge with the neck connecting the base to the latch,
wherein the base has a maximum base width that is greater than a maximum neck width of the neck,
wherein the latch has a maximum latch width that is greater than the maximum neck width,
wherein the maximum latch width is greater than the recess width, and
wherein the door is movable between an open position to provide access to the opening and a closed position in which the door closes the opening and the latch engages both of the locking tabs of the card to secure the door in the closed position;
a tray positioned between the card and the cover, the tray including a plurality of receptacles;
a plurality of batteries, each battery positioned within one of the plurality of receptacles; and
a plurality of tabs, each tab removably attached to one of the batteries, wherein each tab is positioned between the cover and the battery to which the tab is attached;
wherein the tray is rotatable relative to the card and the cover about an axis of rotation that extends through a central post to selectively align one of the receptacles with the opening in a battery removal position; and
wherein with the door in the open position, the tab attached to the battery in the receptacle in the battery removal position is accessible through the opening from the front of the cover and the peripheral edge of the cover.

9. The battery package of claim 8, wherein latch includes two end portions located opposite from each other; and
wherein with the door in the closed position each end portion of the latch is located beneath one of the two locking tabs of the card to secure the door in the closed position.

10. The battery package of claim 8, wherein a pair of card cutouts are located adjacent the locking tabs and are separated by a cutout width measured at the furthest points between the two card cutouts, wherein the cutout width is greater than the recess width;
wherein a pair of door cutouts separate the latch from the base of the door; and
wherein with the door in the closed position, the first card cutout is aligned with the first door cutout and the second card cutout is aligned with the second door cutout.

11. The battery package of claim 8, wherein the door includes a surface recessed from adjacent portions of the door and wherein the surface is recessed toward the tray.

12. The battery package of claim 8, wherein the door includes a plurality of ridges extending radially along the door.

13. The battery package of claim 8, wherein the latch has an outer portion and a ridge extending away from the outer portion with the rear surface of the ridge spaced apart from the rear surface of the outer portion to define a grasping recess configured to assist a user in grasping the latch.

14. The battery package of claim 8, wherein the latch includes a ledge located on the rear side of the latch and the ledge is configured to assist a user in grasping the latch.

15. A battery package, comprising:
a card;
a cover attached to the card, the cover including;
a body having an opening defined in part by two spaced apart opening sides, wherein a first portion of the body is adjacent the first opening side and a second portion of the body is adjacent the second opening side,
a door pivotally attached to the body by a hinge so that the hinge connects the two opening sides,
a first transition protrusion extending from the rear side of the body toward the card, the first transition protrusion located in the first portion of the body, and
a second transition protrusion extending from the rear side of the body toward the card, the second transition protrusion located in the second portion of the body,
wherein the door is movable between an open position to provide access to the opening and a closed position in which the door closes the opening;
a tray positioned between the card and the cover, the tray including a plurality of receptacles;
a plurality of batteries, each battery positioned within one of the plurality of receptacles; and
a plurality of tabs, each tab removably attached to one of the batteries, wherein each tab is positioned between the cover and the battery to which the tab is attached;
wherein the tray is rotatable relative to the card and the cover about an axis of rotation that extends through a central post to selectively align one of the receptacles with the opening in a battery removal position so that as the tray rotates, the battery and the tab of the battery approaching the battery removal position contact and travel along one of the two transition protrusions; and
wherein with the door in the open position, the tab attached to the battery in the receptacle in the battery removal position is accessible through the opening from the front of the cover and the peripheral edge of the cover.

16. The battery package of claim 15, wherein each of the transition protrusions includes a leading surface and a trailing surface located closer to the battery removal position than the leading surface.

17. The battery package of claim 16, wherein the leading surfaces and the trailing surfaces are curved.

18. The battery package of claim 17, wherein the radius of curvature of the leading surface is less than the radius of curvature of the trailing surface.

19. The battery package of claim 16, wherein the body of the cover includes a front portion;
   wherein each leading surface is angled at a leading angle relative to the front portion; and
   wherein each trailing surface is angled at a trailing angle relative to the front portion.

20. The battery package of claim 19, wherein the leading angle is greater than the trailing angle.

\* \* \* \* \*